(12) United States Patent
Langhammer

(10) Patent No.: US 9,747,110 B2
(45) Date of Patent: Aug. 29, 2017

(54) PIPELINED CASCADED DIGITAL SIGNAL PROCESSING STRUCTURES AND METHODS

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 161 days.

(21) Appl. No.: 14/717,657

(22) Filed: May 20, 2015

(65) Prior Publication Data

US 2016/0342422 A1    Nov. 24, 2016

(51) Int. Cl.

| | |
|---|---|
| *G06F 7/544* | (2006.01) |
| *G06F 9/30* | (2006.01) |
| *G06F 15/80* | (2006.01) |
| *G06F 9/38* | (2006.01) |

(52) U.S. Cl.
CPC .......... *G06F 9/3869* (2013.01); *G06F 7/5443* (2013.01); *G06F 9/3012* (2013.01); *G06F 9/3826* (2013.01); *G06F 15/80* (2013.01); *G06F 2207/3868* (2013.01); *G06F 2207/3888* (2013.01); *G06F 2207/3892* (2013.01)

(58) Field of Classification Search
CPC ..................................................... G06F 9/3826
See application file for complete search history.

(56) References Cited

U.S. PATENT DOCUMENTS 8,001,171 B1 *  8/2011  Simkins ................ G06F 17/142
                                                    708/404

* cited by examiner

*Primary Examiner* — Andrew Caldwell
*Assistant Examiner* — Calvin M Brien

(57) ABSTRACT

Circuitry operating under a floating-point mode or a fixed-point mode includes a first circuit accepting a first data input and generating a first data output. The first circuit includes a first arithmetic element accepting the first data input, a plurality of pipeline registers disposed in connection with the first arithmetic element, and a cascade register that outputs the first data output. The circuitry further includes a second circuit accepting a second data input and generating a second data output. The second circuit is cascaded to the first circuit such that the first data output is connected to the second data input via the cascade register. The cascade register is selectively bypassed when the first circuit is operated under the fixed-point mode.

11 Claims, 21 Drawing Sheets

PIPELINED CASCADED DIGITAL SIGNAL PROCESSING STRUCTURES AND METHODS

FIELD OF THE INVENTION

This invention relates to circuitry that can be used to implement pipelined cascaded digital signal processing (DSP) structure to reduce propagation latency between DSP structures.

BACKGROUND OF THE INVENTION

In a large scale digital circuit such as, but not limited to, a Field-Programmable Gate Array (FPGA) or an application-specific integrated circuit (ASIC), a number of DSP structures often work together to implement complex tasks. To achieve improved performance, these DSP structures are often operated at high speeds. While FPGA speed, or alternatively the ASIC processing speed, has been improved, one constraint is the propagation delay of signals between two DSP structures, especially when a random routing distance between the two DSP structures is encountered, which can be introduced by row based redundancy. For example, when a number of DSP structures or blocks are connected in a systolic mode to improve system throughput, one of the challenges in operating 1 GHz FPGA is the efficiency of interconnection between DSP blocks. Once the 1 GHz DSP block has been designed, multiple DSP blocks are connected together to create a single structure, and operated at a high speed, for example, 1 GHz in a single structure, and thus efficient interconnection between the blocks is desired to improve multi-block performance.

One method for improving performance in this case would be to add pipeline stages between the DSP structures. Pipelining techniques can be used to enhance processing speed at a critical path of the DSP structure by allowing different functional units to operate concurrently. Pipelined systolic structures, however, may not operate correctly, as the enable flow can be disturbed at times. Thus, summing of values across DSP structures can yield an inaccurate result, as the pipeline depths are no longer balanced. Additional balancing registers can be added to balance the delays, which can incur additional hardware and logic cost.

SUMMARY OF THE INVENTION

In accordance with embodiments of the present invention, several architectures for interblock registering to improve multi-block performance are presented.

Therefore, in accordance with embodiments of the present invention there is provided circuitry accepting a data input and generating a data output based on said data input. The circuitry includes a first circuit block, which further includes a first multiplier circuit, a first plurality of pipeline registers disposed to pipeline an operation of the first multiplier circuit, a first adder circuit accepting a first adder input from within the first circuit block, and a second adder input from a first interblock connection. The circuitry further includes a second circuit block cascaded to the first circuit block via the first interblock connection, which includes a second multiplier circuit, and a second plurality of pipeline registers disposed to pipeline an operation of the second multiplier circuit. One or more of the second plurality of pipeline registers are selectively bypassed to balance the first adder input and the second adder input.

In accordance with other embodiments of the present invention, there is provided circuitry accepting a data input and generating an output sum based on said data input. The circuitry includes a first systolic FIR structure that has a first adder circuit and a first ripple enable register placed before the first adder circuit. The first FIR structure is retimed by the first ripple enable register to allow additional pipelines to be added throughout the first systolic FIR structure. The circuitry further includes a second systolic FIR structure, connected to the first systolic FIR structure via an interblock connection. A first cascading pipeline register connects the first systolic FIR structure and the second systolic FIR structure.

In accordance with another embodiment of the present invention, there is provided circuitry operating under a floating-point mode or a fixed-point mode. The circuitry includes a first circuit accepting a first data input and generating a first data output. The first circuit includes a first arithmetic element accepting the first data input, a plurality of pipeline registers disposed in connection with the first arithmetic element, and a cascade register that outputs the first data output. The circuitry further includes a second circuit accepting a second data input and generating a second data output. The second circuit is cascaded to the first circuit such that the first data output is connected to the second data input via the cascade register. The cascade register is selectively bypassed when the first circuit is operated under the fixed-point mode. For example, the connection configuration for the cascade register can be a selectable connection that allows the cascade register to be selectively bypassed.

In accordance with another embodiment of the present invention there is provided a method of operating cascaded circuitry. The method includes receiving, via a plurality of input registers within a first circuit, a data input signal. The first circuit includes a first arithmetic element that supports floating-point operation, a plurality of pipeline registers that pipeline an operation of the first arithmetic element, and a cascade register that is connected to a second circuit. The method further includes receiving, from a processor, a first command signal to use the cascade register. In response to the first command signal, the circuitry selectively bypasses an input register from the plurality of input registers, or a pipeline register from the plurality of pipeline registers to compensate for a delay from the cascade register. The circuitry then transmits, via the cascade register, an interblock data signal from the first circuit to the second circuit.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Unless otherwise indicated, the discussion that follows will be based on an example of a programmable integrated circuit device such as an FPGA. However, it should be noted that the subject matter disclosed herein may be used in any kind of fixed or programmable device, including, but not limited to, an application-specific integrated circuit (ASIC).

Figure 7:
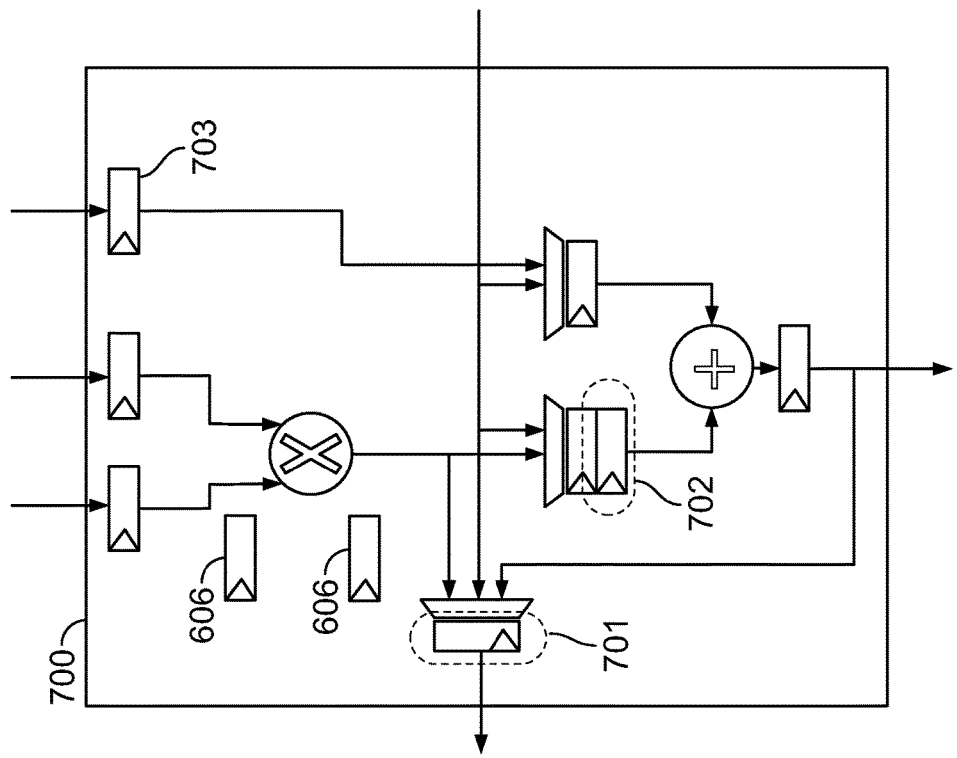
FIG. 7 shows an example circuit diagram of a DSP block with cascade and balancing registers configured in a floating-point mode.
Figure 8:
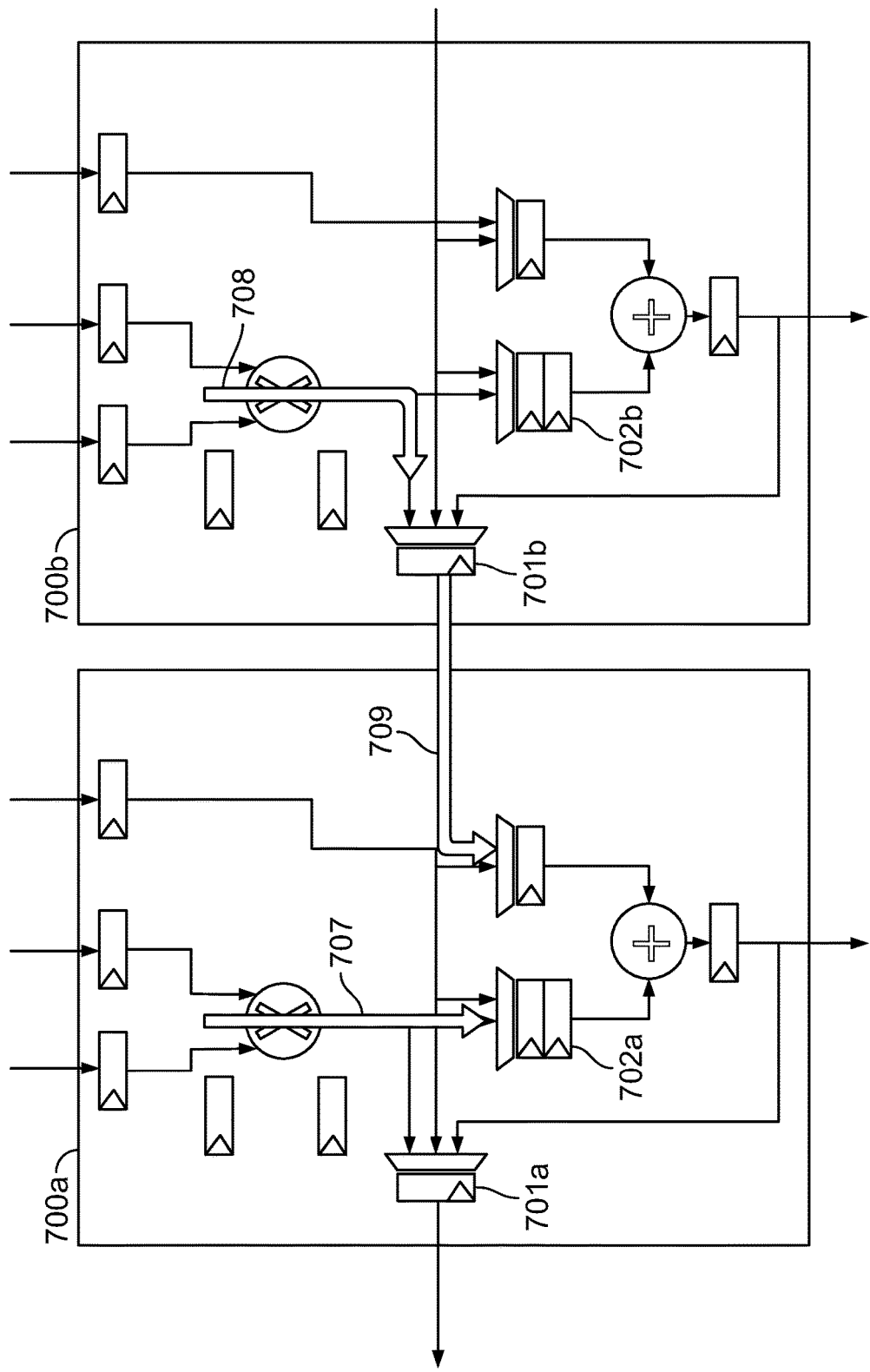
FIG. 8 shows an example circuit diagram of two adjacent DSP blocks operated in pipelined and balanced vector modes.
Figure 9A:
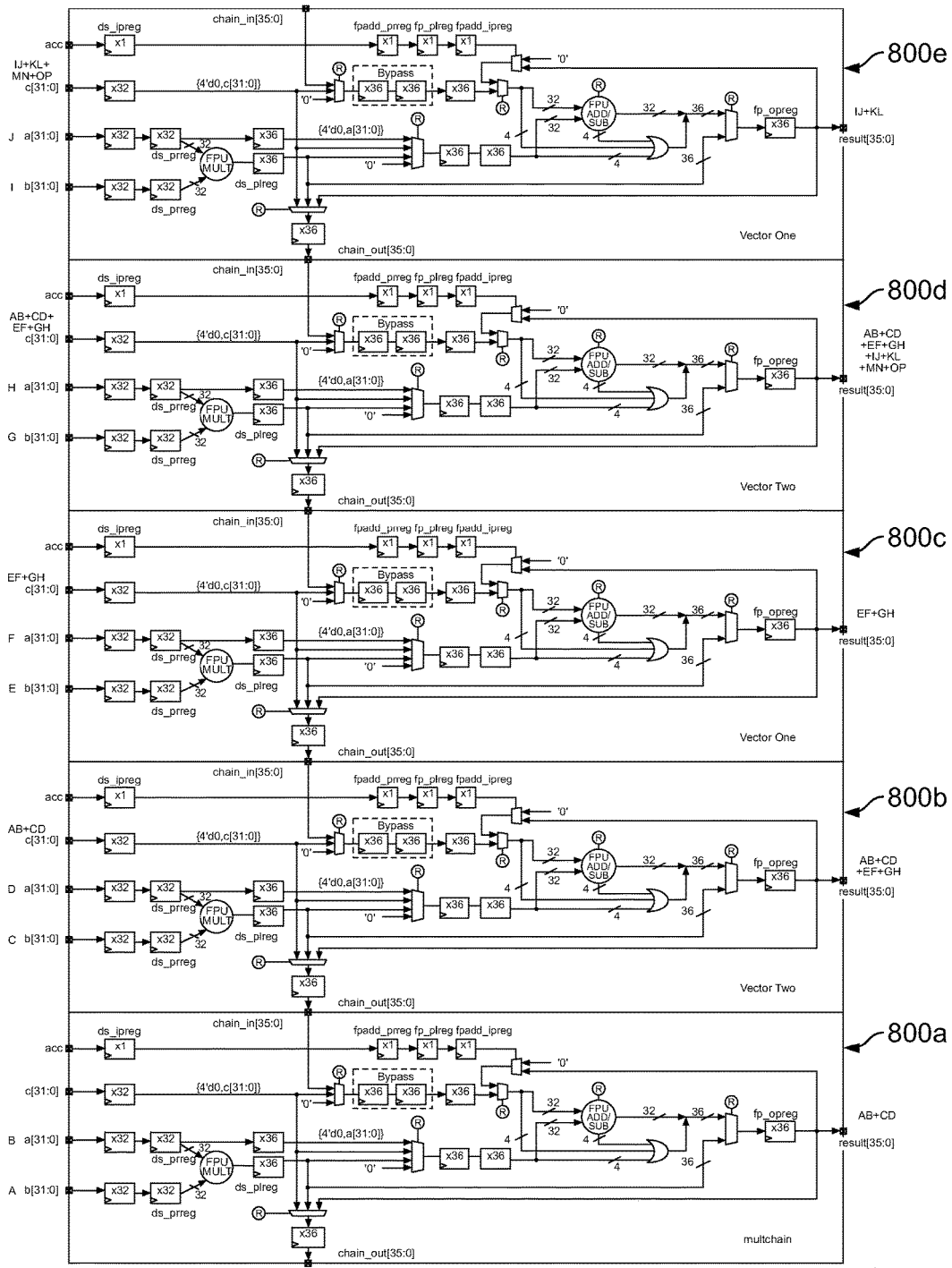
FIGS. 9A-F (hereinafter collectively referred to as "FIG. 9") show an example circuit of a recursive-vector structure using similar pipeline and balancing techniques shown in FIG. 8.
Figure 9B:
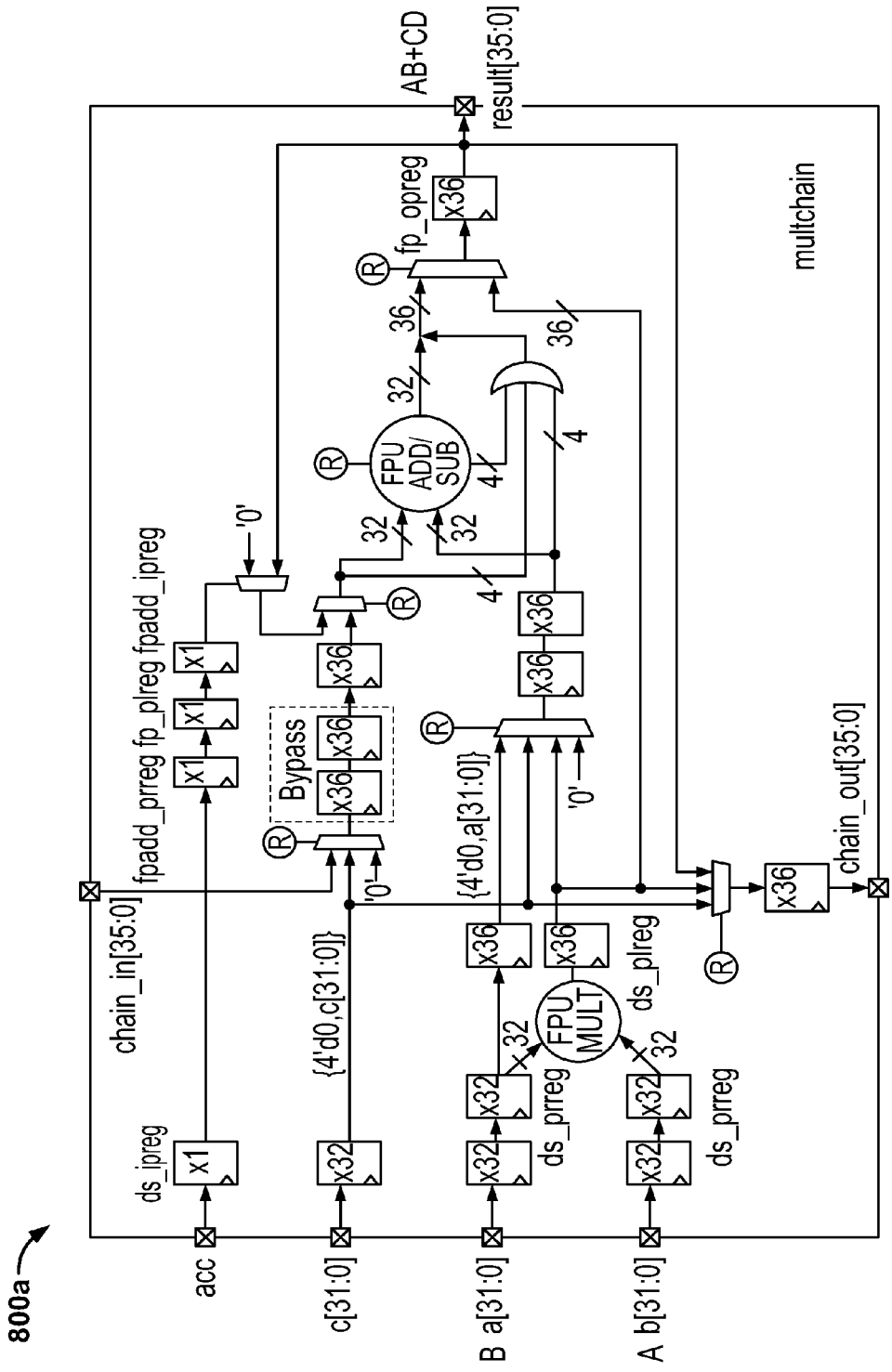
Figure 9C:
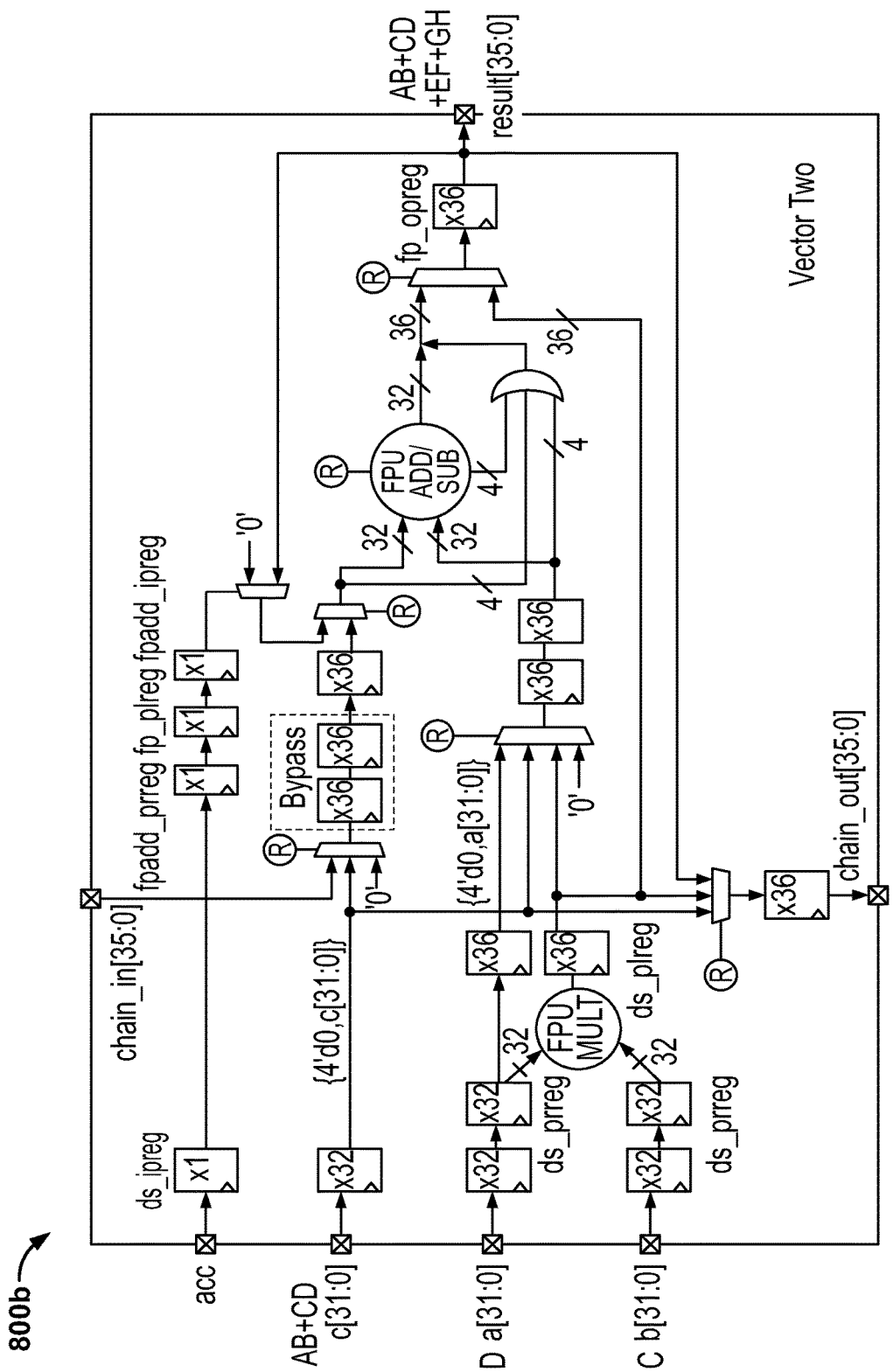
Figure 9D:
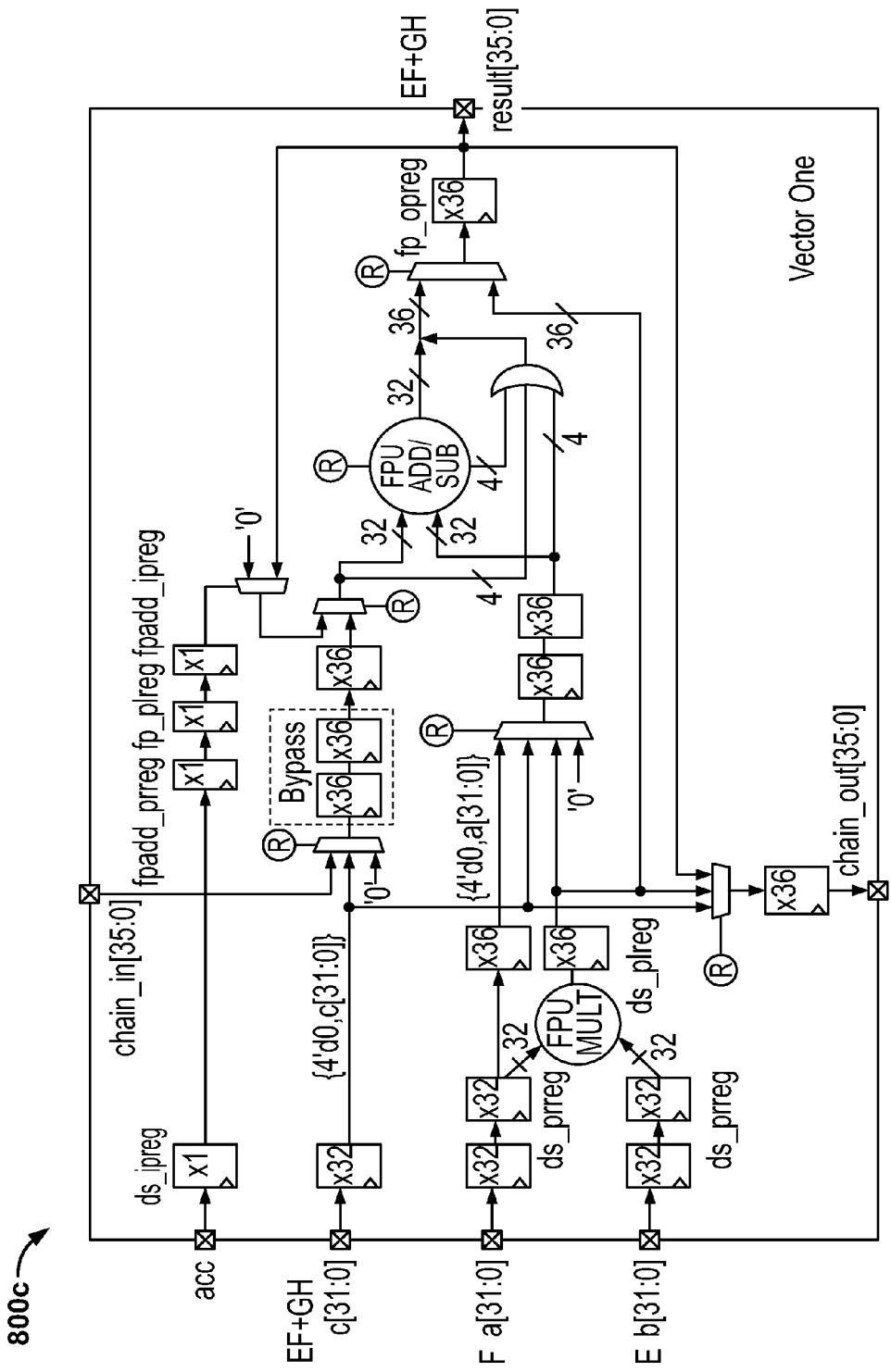
Figure 9E:
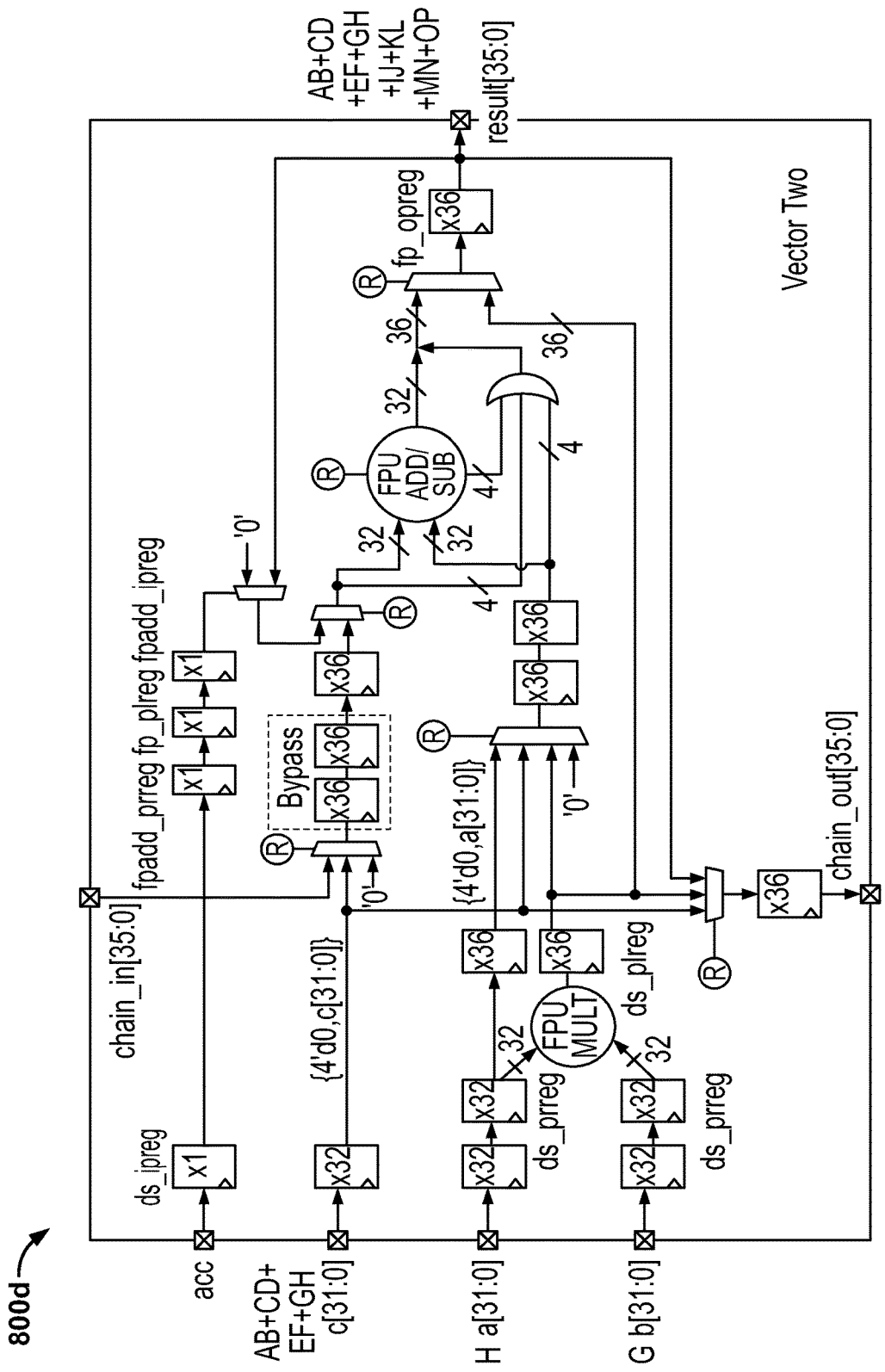
Figure 9F:
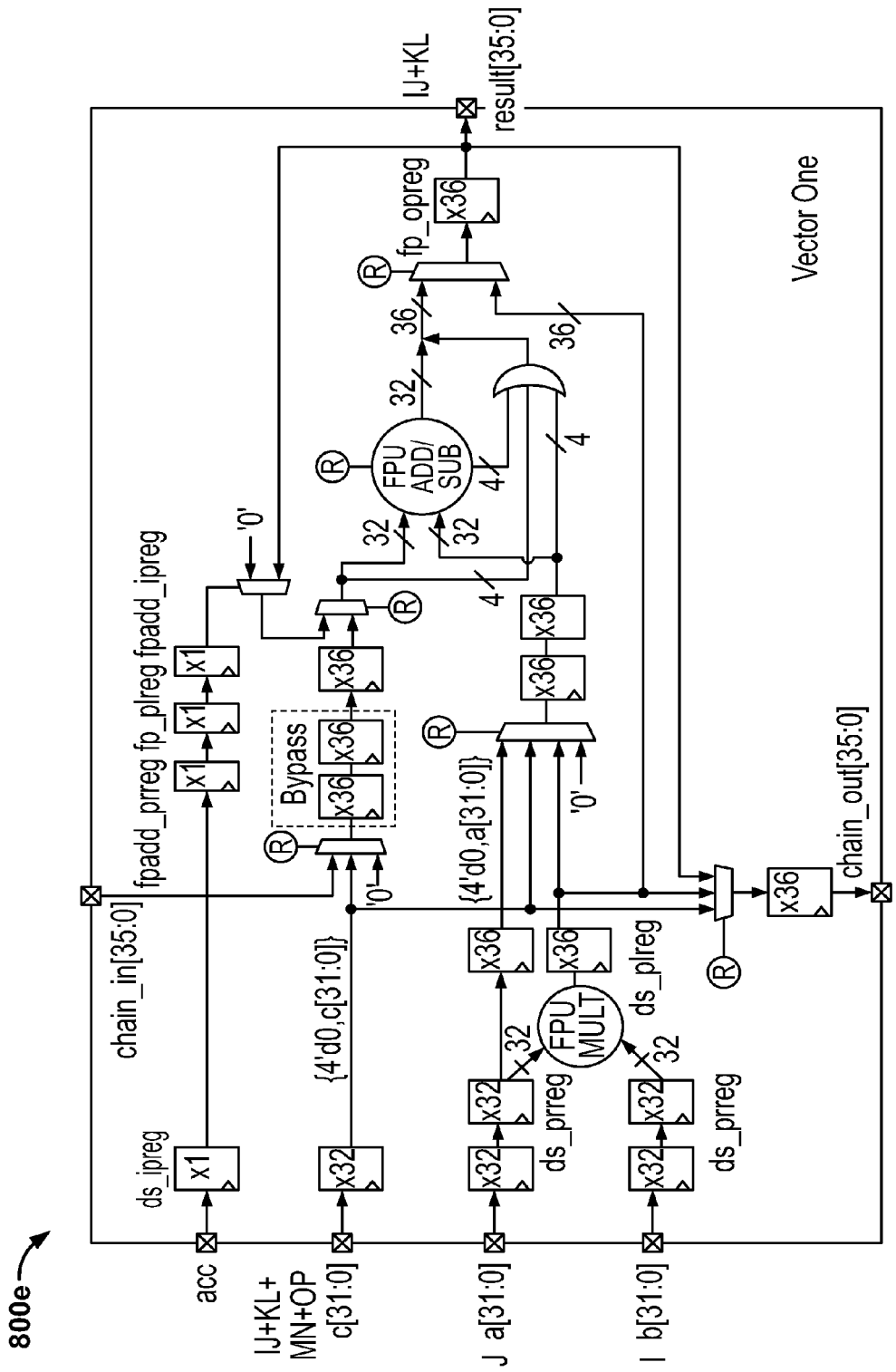

In some embodiments of the present invention, when multiple DSP blocks are cascaded to perform a series of tasks in a large system, pipelines can be reused in the cascaded set of DSP structures in an FPGA to provide interblock registering and thus improve system performance. Signals can be rerouted within the DSP structures to use existing pipeline registers in the structure, without introducing additional registers to save hardware. For example, systolic finite impulse response (FIR) filters can use configurable pipeline registers between DSP structures, as illustrated in FIGS. 1-5. Floating-point structures can use configurable registers between multipliers and adders, as illustrated in FIGS. 6-8. In a general case, floating-point structures can be retimed by pipeline registers to balance delay throughout a larger system, and under a recursive-vector mode, as illustrated in FIGS. 10-15.

Figure 1:
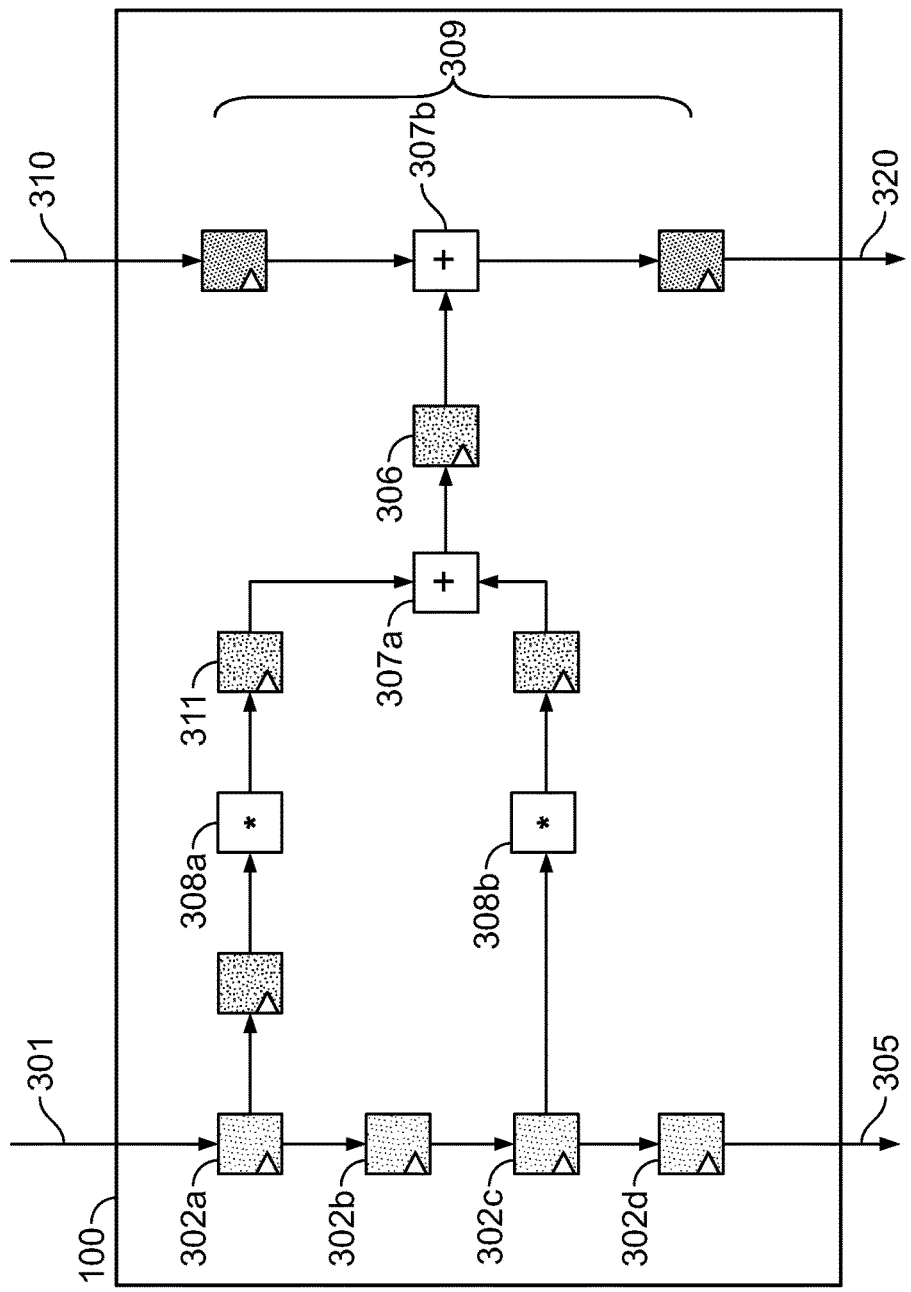
FIG. 1 shows an example circuit diagram of DSP block for a two tap systolic FIR filter.
Figure 1:
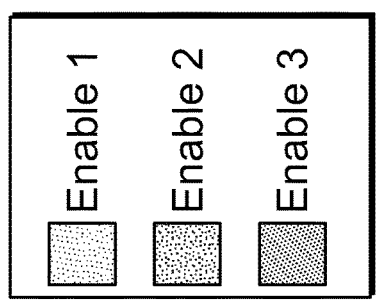

FIG. 1 shows an example circuit diagram of DSP block 100 for a two tap systolic FIR filter. A systolic filter can be composed of multiple cascaded DSP blocks, e.g., with data inputs 301, 310 being connected to the data outputs 305, 320 of a cascaded DSP block. Within a DSP block 100, a series of input registers 302a-d can be fed with an enable input signal (not shown in FIG. 1). A single (flat) enable register 302a could be used, or alternately as shown in FIG. 1, multiple enable registers 302a-d can be used to continue processing data in the filter if the input is halted. In the respective example in FIG. 1 and the alternative examples shown in FIGS. 2-5, registers are shown with different fill-patterns to indicate the respective register is enabled by a different enable signal, which can be configured based on the placement of the respective register. For example, input registers 302a-d can be operated by a first enable signal; registers (e.g., 311, 306, etc.) used to delay or balance the adders 307a-b (so that the two inputs at the adder have equal or substantially equal register delays) and/or the multipliers 308a-b can be operated by a second enable signal; and registers on the systolic chain 309 can be operated by a third enable signal. When additional pipelining registers are added to the circuit (e.g., see registers 315a-b in FIG. 3), these pipelining registers can be operated by the same second enable signal. In these examples, not all registers in the DSP block are directly connected to the same enable input; and thus the fan-out of enable input can be reduced.

As shown in FIG. 1, a register 306 is placed between the adder 307a of the two multipliers 308a-b and the adder 307b for the systolic chain 309. This can be expensive in hardware terms, as either two carry-propagate adders (CPAs) are involved, or the first adder 307a needs to be a redundant form, which may result in twice the number of registers. Alternatively, when the register 306 is moved to a position as a rippled enable register, leaving no additional physical element between the two adders 307a-b, the adders 307a-b can be merged into one adder to save hardware resource. Further discussion on retiming an output stage of a systolic FIR filter to merge the adders can be found in copending, commonly-assigned U.S. patent application Ser. No. 14/717, 449, filed on May 20, 2015, which is hereby expressly incorporated by reference herein in its entirety.

Figure 2:
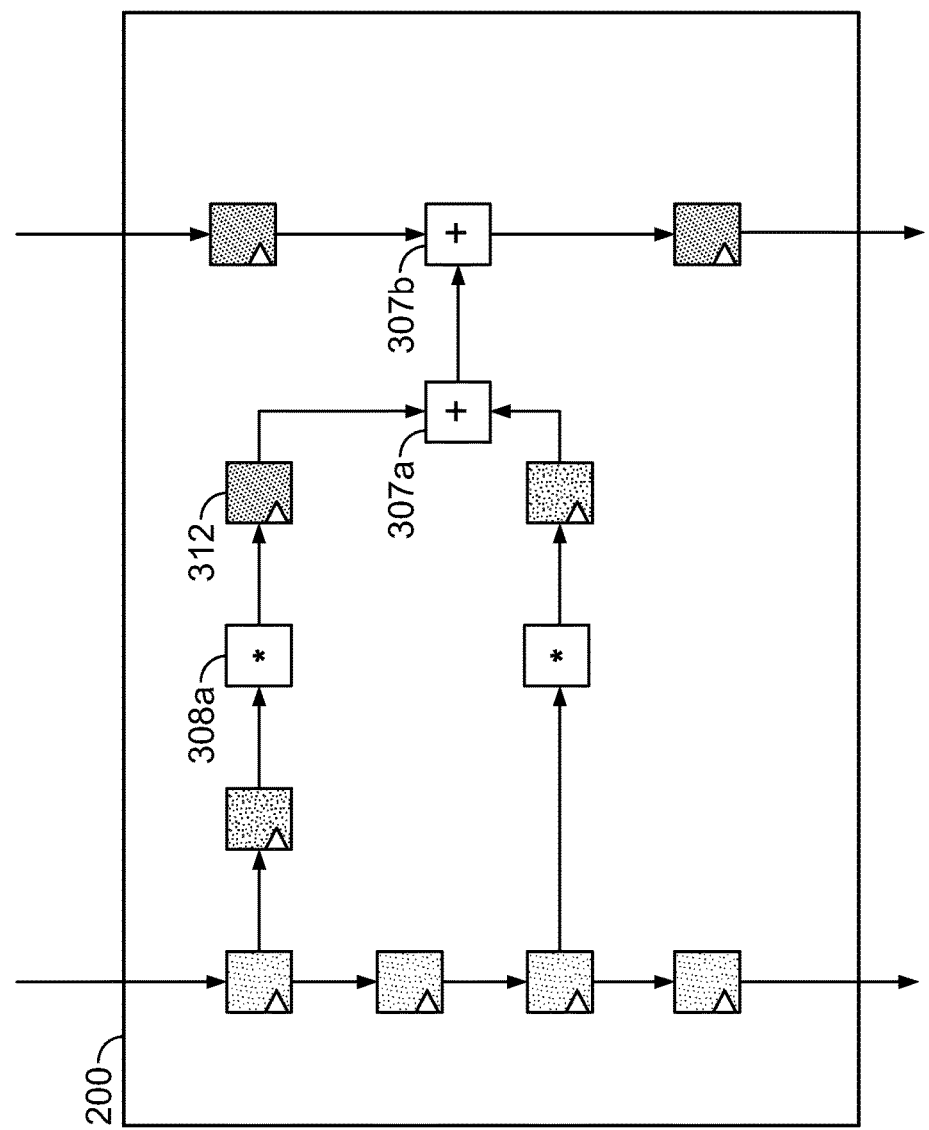
FIG. 2 shows an example circuit diagram of a DSP block that can be viewed as a retimed version of the DSP block in FIG. 1, operated with a rippled enable register.

FIG. 2 shows an example circuit diagram of a DSP block 200 that can be viewed as a retimed version of the DSP block 100 in FIG. 1, operated with a rippled enable register 312. As shown in FIGS. 1-2, the register 306 in FIG. 1 can be moved to a position between the multiplier 308a and the adder 307a and then be merged with register 311 resulting in register 312. In this case, the enable of the register 312 including the merged registers 311 and 306 is the enable of the output chain registers 309.

Figure 3:
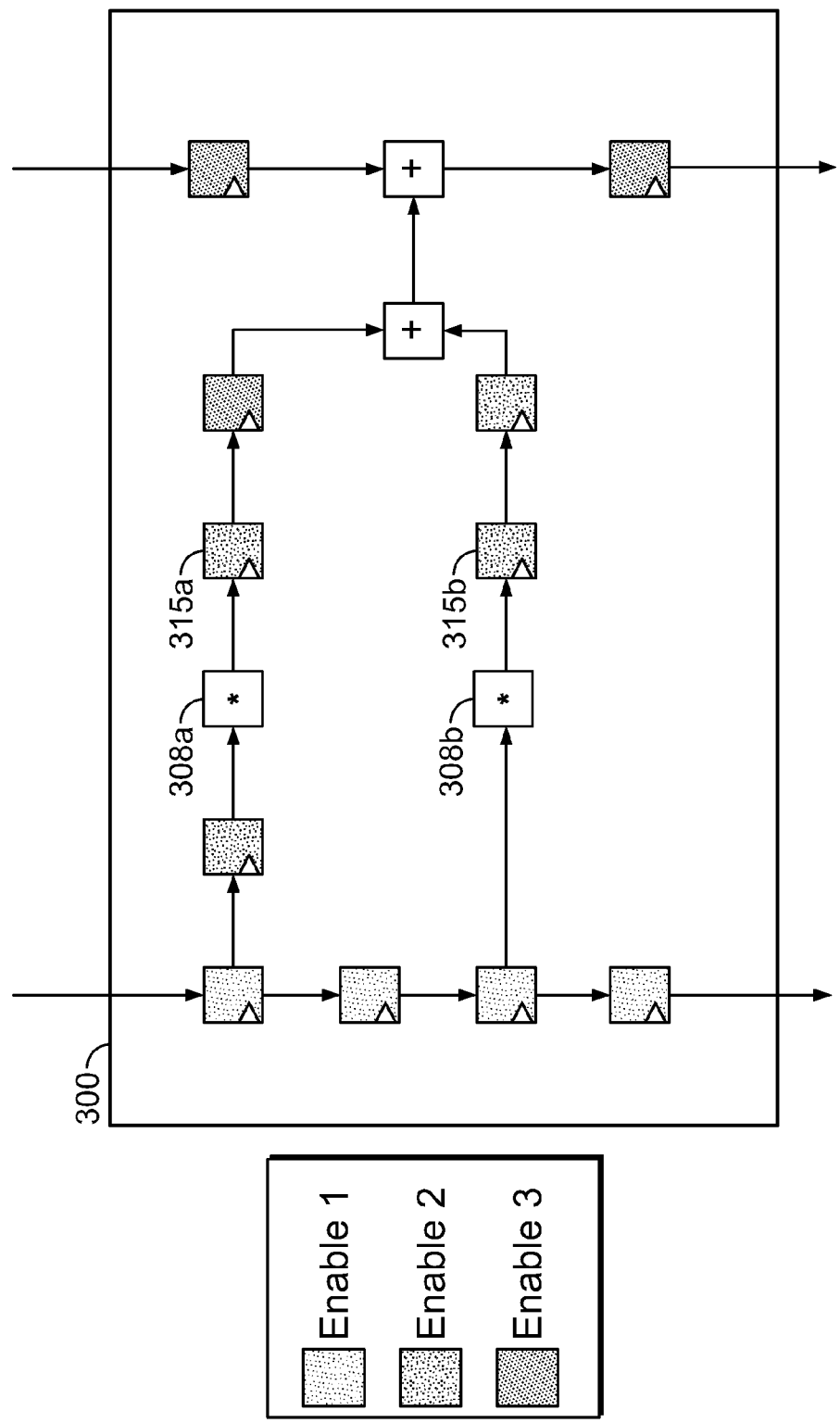
FIG. 3 shows an example circuit diagram of a DSP block showing the retimed DSP block with additional pipelines.

FIG. 3 shows an example circuit diagram of a DSP block 300 showing the retimed DSP block 200 with additional pipelines 315a-b. Once the DSP block 300 has been retimed, additional pipelining can be added anywhere in each multiplier path, e.g., as shown at pipelines 315a-b in FIG. 3. Any number of pipelines can be added before or after the multiplier 308a or 308b (which can be retimed through the multiplier) to increase performance, as long as they are grouped into the same enable register (as shown in the respective fill-pattern in FIG. 3) that are enabled by the respective enable signal.

Continuing on with the pipelined DSP block 300, while multiple such blocks are cascaded, the path lengths of the connections between the DSP blocks can become the critical path to add pipelines when implementing a high performance system.

Figure 4:
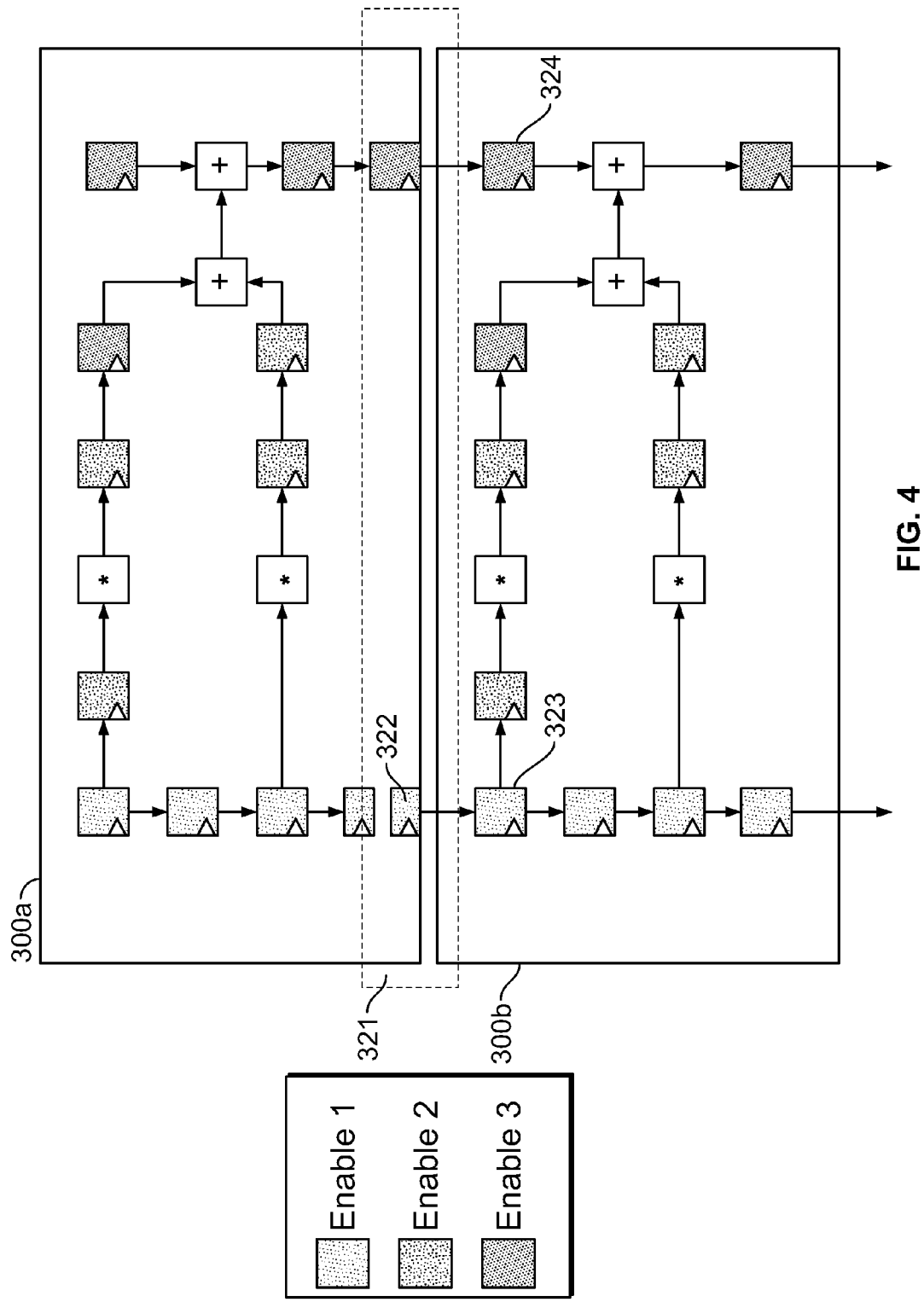
FIG. 4 shows an example circuit diagram of a pair of cascaded DSP blocks that have a cascading pipeline at the output of the DSP block.

FIG. 4 shows an example circuit diagram of a pair of cascaded DSP blocks 300a-b that have a cascading pipeline 321 at the output of the DSP block 300a. The DSP blocks 300a-b can be analogous to the DSP block 300 in FIG. 3. The cascading pipeline 321 can include one or more pipeline registers (e.g., see 322) that create extra delays so as to pipeline the operations of DSP block 300a and DSP block 300b. A single pipeline register 322 is shown in FIG. 4, but multiple registers could be used to pipeline the operations of DSP block 300a and DSP block 300b. The register 322, or multiple equivalent registers can be placed, either at the output of the DSP block 300a, input of the DSP block 300b, or distributed amongst the two DSP blocks. Another place where a pipeline register or registers could be located is between the two blocks, which could reduce the performance impact of the row based redundancy. The use of pipeline register(s) 322 can be customized or optional, e.g., one of, some of, or all of the pipeline register(s) 322 could be bypassed, when the latency vs. speed tradeoff is specified.

For example, when a large number of pipeline register(s) 322 are added, the throughput of the DSP blocks 300a-b increase, but with the additional register delay incurred by the pipelines, the latency may increase. In some implementations, when a device or system that employs the DSP blocks 300a-b determines the system throughput and or speed has reached a desirable level, the device or system can selectively bypass one or more pipeline registers 322 to reduce latency.

Figure 5:
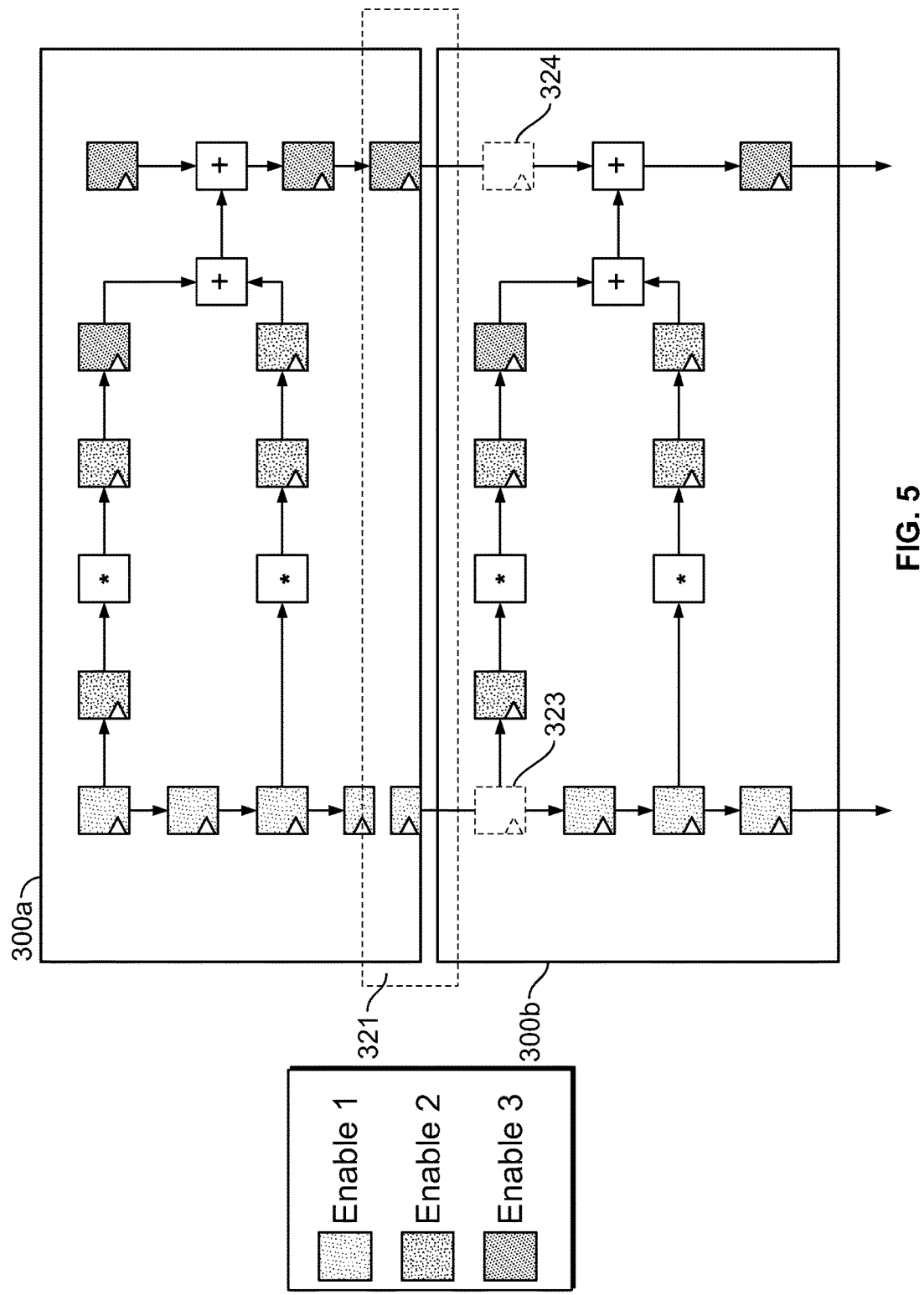
FIG. 5 shows another example circuit diagram of retimed FIR filters with cascading pipelines having one or more bypassed pipeline registers.
Figure 6:
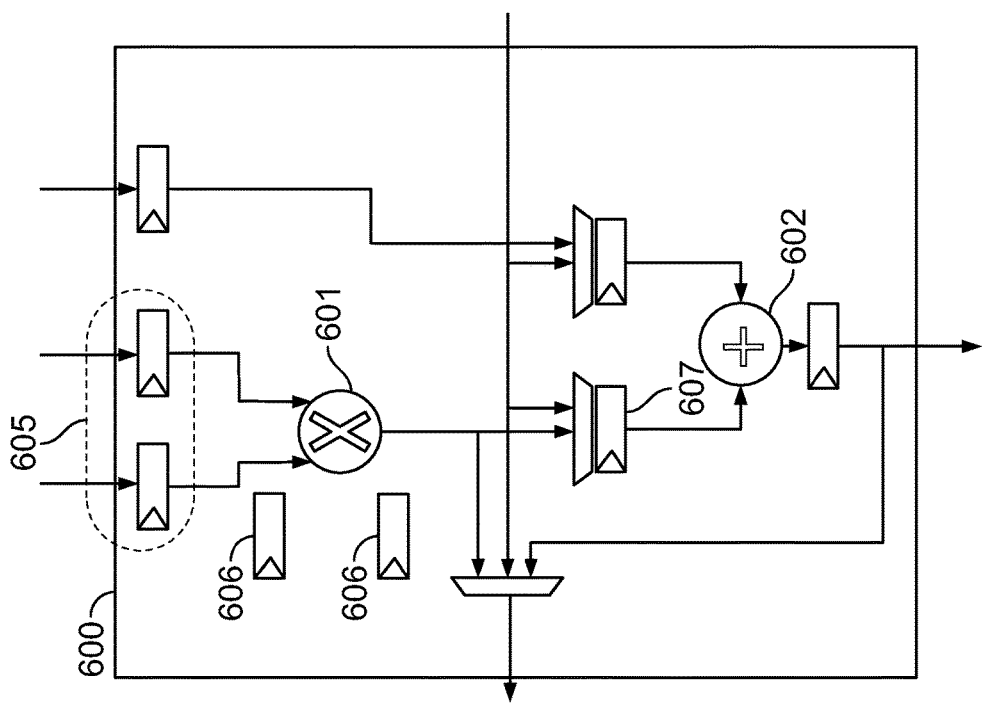
FIG. 6 shows an example circuit diagram of a DSP block configured in a floating-point mode.

FIG. 5 shows another example circuit diagram of retimed FIR filters with cascading pipelines having one or more bypassed pipeline registers. Adding pipeline registers in the interface between the blocks may allow the register distribution to be retimed, as shown in FIG. 5. The first register 323 or 324 (shown in FIG. 4) in the input of the block 300b could be selectively bypassed. For example, the circuit between DSP blocks 300a-b can be pre-configured with a direct connection between blocks 300a-b without registers 323-324, and such direct connection can be selectively chosen by a system processor. When the registers 323-324 are selectively bypassed, the circuit of DSP blocks 300a-b would be functionally equivalent to the direct cascading of multiple blocks 300 as shown in FIG. 3. Depending on the characteristics of the device that employs the DSP blocks 300a-b, the circuit in FIG. 5 can perform faster than the cascading of multiple blocks in FIG. 3. In this case, the device fitting tools may automatically operate a series of DSP blocks in a mode shown in FIG. 5 rather than that in FIG. 3.

FIG. 6 shows an example circuit diagram of a DSP block 600 configured in a floating-point mode. A floating-point multiplier 601 and a floating-point adder 602 are included in the DSP block 600, along with logic (e.g., any other arithmetic elements) and routing to implement more complex functions such as multiply-add, multiply-accumulate, recursive-vector structures, and/or the like. Some registers, buses, and features are not illustrated in FIG. 6 for simplicity.

The multiplier pipeline has an input register stage 605, two internal register stages 606, and a register stage 607 between it and the following floating-point adder. One of the supported modes, the recursive-vector mode, takes the floating-point multiplier 601 output and routes it to the next DSP block through a bus directly into the adjacent DSP block (e.g., to the right of block 600, not shown in FIG. 6). This path can be the critical path for the performance of the floating-point recursive-vector mode as it is routed through the final CPA of the multiplier pipeline, without the benefit of an register after the last level of logic—this is done to minimize the number of register stages in the multiplier pipeline, which can be expensive in terms of area, and also latency. Further discussion on floating-point mode operation can be found in copending, commonly-assigned U.S. patent application Ser. No. 13/752,661, filed Jan. 29, 2013, which is hereby expressly incorporated by reference herein in its entirety.

FIG. 7 shows an example circuit diagram of a DSP block 700 with cascade and balancing registers configured in a floating-point mode. The DSP block 700 can be configured to operate under both fixed-point mode and floating-point mode, i.e., under the fixed-point mode, the block 700 may generate a data output in the form of a fixed-point number; and under the floating-point mode, the block 700 may generate a data output in the form of a floating-point number. In some examples, the fixed-point and floating-point multiplier pipelines can share the same logic. The floating-point modes, however, may have a more challenging processing speed issue than the fixed-point modes, as the large combinatorial structure of the floating-point adder may lead to a more complex critical path in the floating-point functionality. For example, under the fixed-point mode, interblock data is passed between DSP blocks from an output register of one DSP block to the input register of another DSP block. Under the floating-point mode, however, interblock data can be passed from a multiplier, an adder or an output of a DSP block to the input of another DSP block. As extra logic is usually used after the pipelines of a multiplier or an adder, the data coming out of the multiplier or the adder in one DSP block may then be routed through the extra logic before it is transmitted to another DSP block, which leads to a slower speed under the floating-point mode as compared to the fixed-point mode. Thus the fixed-point modes are often desired to have a higher speed expectation or requirement.

The overall pipeline depth of both the fixed and floating-point modes can be preserved by providing a cascade register 701 on the output of the DSP block 700 before routing to the next DSP block. Adding register 701 can be more efficient than adding another register into the multiplier pipeline 606 because it only has to be used for the floating-point chaining, and the higher speed fixed-point data may not need to pass through it. Since under the fixed-point mode, data is usually transmitted in a 64-bit format, and the floating-point mode has 32 bits, processing efficiency is improved while the fixed-point data can skip one or more registers in the pipeline. When the register 701 is chosen to be used, the recursive-vector mode case by another input register 703 on the floating-point adder path may need to be balanced for such that the two input paths of the adder in block 700 have equal or substantially equal register delays. In this example, register 702 is added, and is used by the slower floating-point path, but the faster fixed-point data may not need to use it.

FIG. 8 shows an example circuit diagram of two adjacent DSP blocks 700a-b operated in pipelined and balanced vector modes. As shown in FIG. 8, additional interblock pipeline registers 701a-b and balancing registers 702a-b are included to support a higher performance recursive-vector mode. The two flow paths 707 and 708-709 can have the same pipeline depth.

FIG. 9 shows an example circuit of a recursive-vector structure using similar pipeline and balancing techniques shown in FIG. 8. For example, blocks 800a-e can be cascaded to implement a recursive-vector structure. Under the recursive vector mode, for example, the output of block 800*a* can be based on the inputs A, B of block 800*a* and the inputs C, D of block 800*b*, e.g., "AB+CD"; the output of block 800*b* can be based on the outputs of two adjacent blocks, e.g., the output "EF+GH" of block 800*c* and the output "AB+CD" of block 800*a*, which generate an output for block 800*b* as "AB+CD+EF+GH," and so forth.

Figure 10:
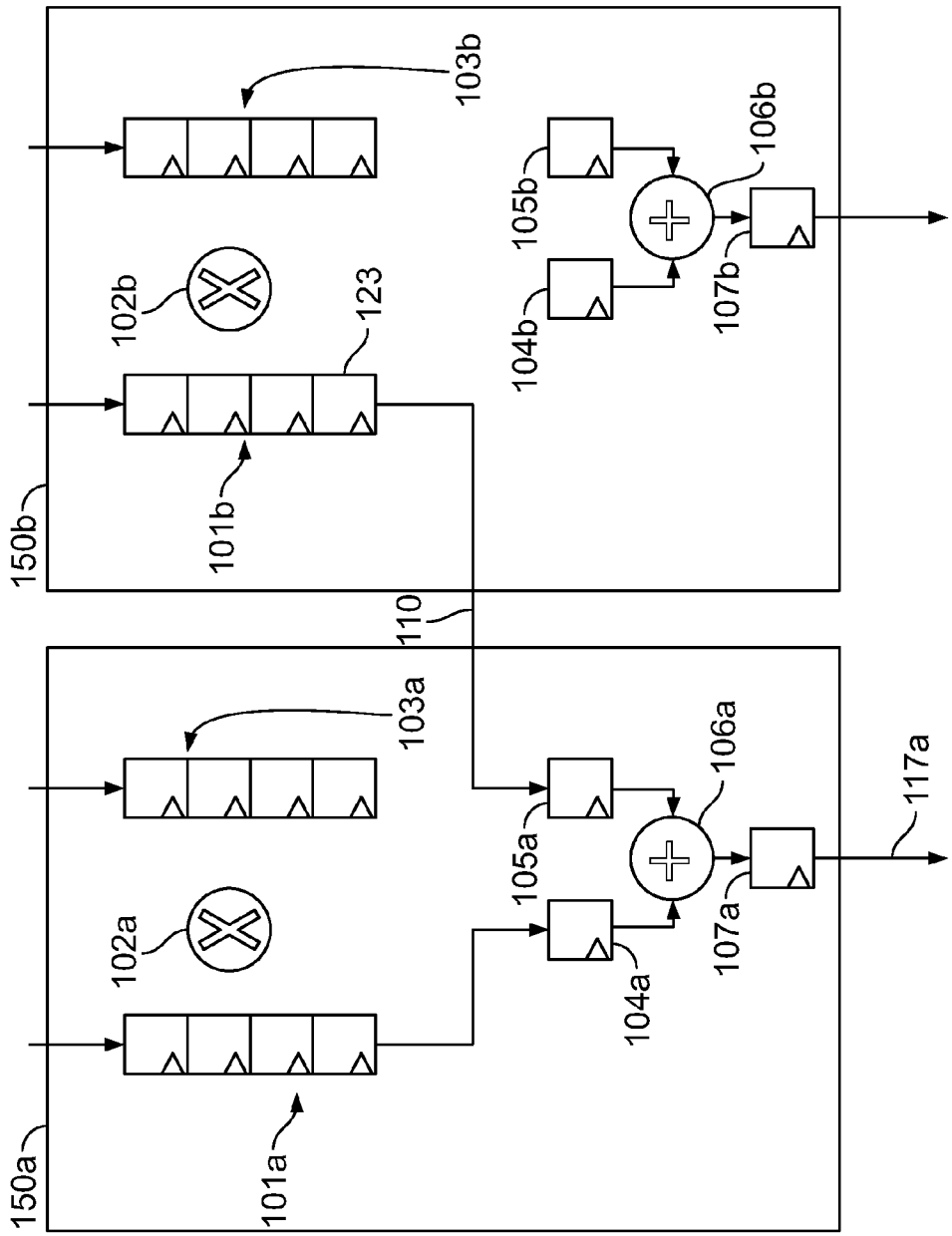
FIGS. 10-11 show example circuit diagrams of a generalized structure for cascaded pipelined DSP blocks 150a-b, illustrating that the pipelining and balancing technique shown in FIGS. 7-9 can be applied to any DSP structure.
Figure 11:
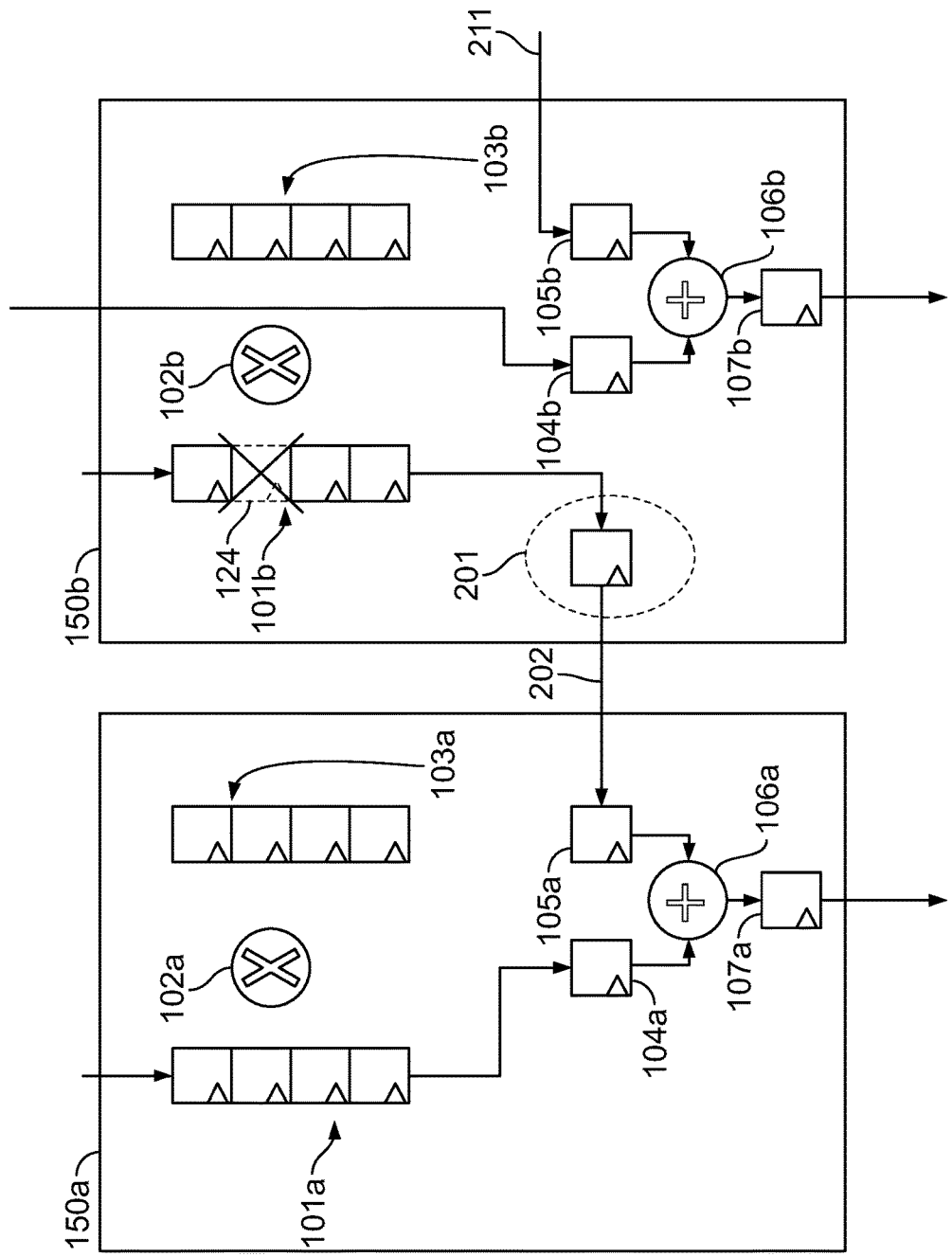

FIGS. 10-11 show example circuit diagrams of a generalized structure for cascaded pipelined DSP blocks 150*a-b*, illustrating that the pipelining and balancing technique shown in FIGS. 7-9 can be applied to any DSP structure. As shown in FIG. 10, two DSP blocks 150*a-b* are cascaded through connection 110 to output a sum 117*a* of the result from multiplier 102*a* in block 150*a* and the result from multiplier 102*b* in another block 150*b*. Within each block 150*a-b*, a number of pipeline registers 101*a* or 101*b* are provided for a multiplier 102*a* or 102*b*, which are balanced by the input balancing registers 103*a* or 103*b*, respectively. For illustrative purpose, four pipelines are shown for registers 101*a* or 101*b*, but any number of pipelines can be used at registers 101*a* or 101*b*.

In each of the blocks 150*a-b*, adder input registers 104*a*-105*a* and 104*b*-105*b* connect to the adder 106*a-b*, respectively. The register 104*a* accepts the multiplication result from the multiplier in the same DSP block and the other register 105*a* accepts the multiplication result from the multiplier in the adjacent DSP block. For example, the register 104*a* in DSP block 150*a* is connected to multiplier pipeline 101*a* of block 150*a*, and register 105*a* in DSP block 140*a* is connected to multiplier pipeline 101*b* of block 150*b*. Output of the adder 106*a* is passed through an output register 107*a* that produces the DSP block output signal 117*a*.

The interblock connection 110 can be used to implement one stage of a recursive-vector mode. In DSP block 150*b*, even when the last register 123 of pipelines 101 has no logic between itself and register 105 of the adjacent block 150*a*, the long routing path may still be the critical path in the vector mode, especially considering the impact of redundancy (as further discussed in connection with FIG. 13).

As shown in FIG. 11, similar to the cascade register 701 shown in FIG. 7, a cascade register can be introduced in the general case shown in FIG. 10, even without requiring an associated balancing register. As discussed in connection with FIG. 7, the fixed-point and floating-point multiplier pipelines can share the same logic, but the fixed-point modes may be desired to be operated at a higher speed than the floating-point modes. The overall pipeline depth of both the fixed and floating-point modes can be preserved by providing a shadow register 201 on the output of the DSP block 150*b* before routing to the next DSP block 150*a* via interblock connection 202 (interconnection 211 shows the connection to another DSP block that is not shown in FIG. 11). The shadow register 201 can be balanced without adding a balancing register after the register 104*a* in block 150*a* (as the balancing register 702 in FIG. 7), but by bypassing one or more pipeline registers (e.g., register 124 of pipelines 101*b* in the respective example) at the multiplier 102*b*. In this way, the processing speed will not be reduced since the total number of registers along the path of elements 101, 201 and connection 202 remain unchanged, and thus no additional balancing register to balance register 201 is needed.

In the respective example, the shadow register 201 may only be used when the floating-point mode is invoked; and in the fixed-point interblock modes, data can be directly routed without passing through the shadow register 201. As previously discussed in connection with FIG. 7, as the fixed-point mode may have a higher data demand then the floating-point mode (64-bit vs. 32-bit), bypassing the shadow register 201 may help to increase data transmission efficiency in the fixed-point mode. Also, the latency of the fixed-point modes may be less than the floating-point modes because the final CPA 106*a-b* of the multiplier pipeline can be combined with all of the required fixed-point chaining and accumulation, while the floating-point modes may require a separate floating-point arithmetic logic unit (ALU). The speed reduction resulting from the bypassed register 124 may not affect the performance of the floating-point mode, which will be specified to operate at a lower speed than that of the fixed-point mode.

Figure 12:
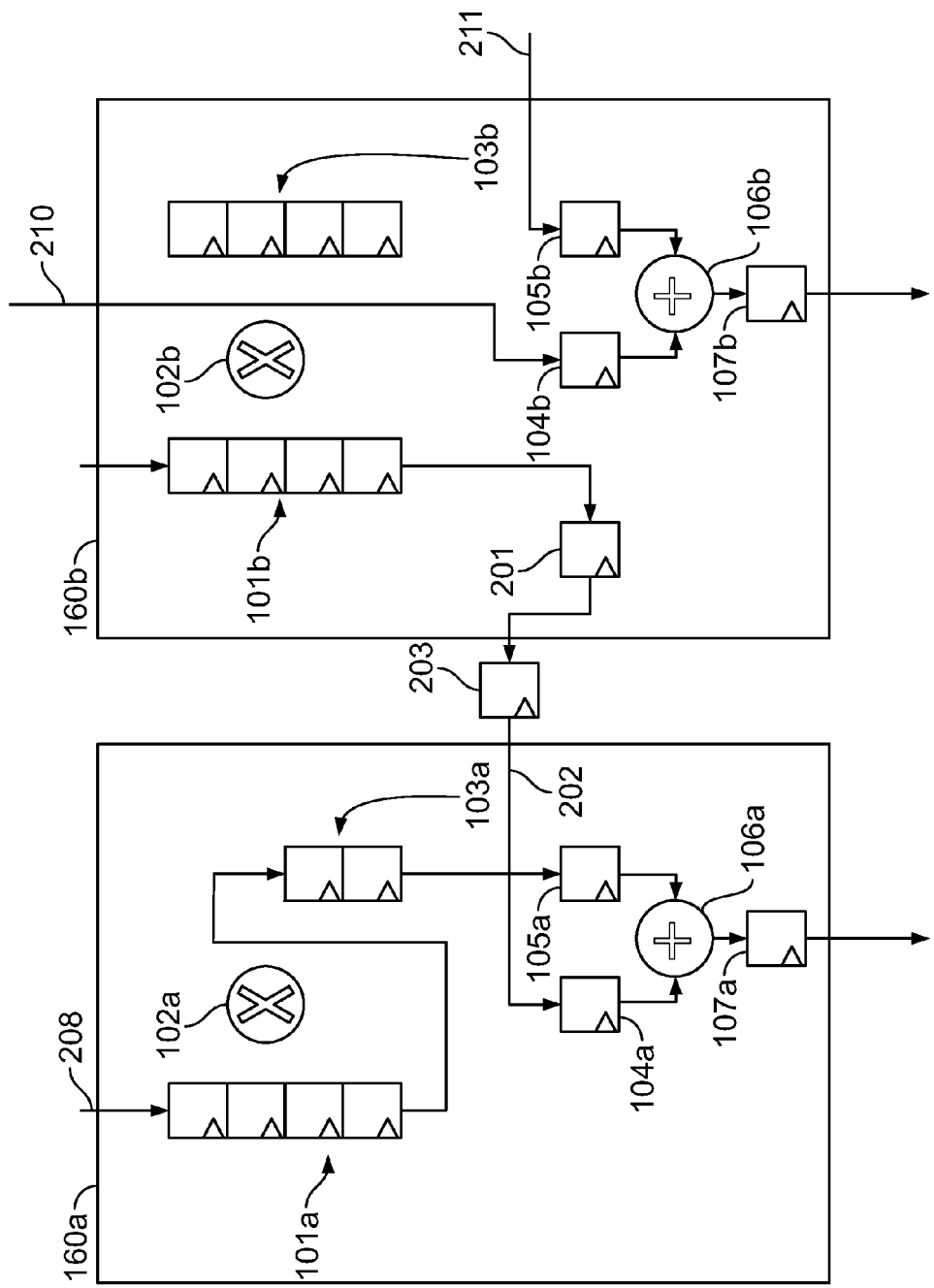
FIG. 12 shows an example circuit diagram in an alternative implementation of a generalized structure for cascaded pipelined DSP blocks with more interblock registers, without requiring additional hardware for the balancing registers.

FIG. 12 shows an example circuit diagram in an alternative implementation of a generalized structure for cascaded pipelined DSP blocks 160*a-b* with more interblock registers 201 and 203, without requiring additional hardware for the balancing registers. As shown in FIG. 12, the floating-point adder 106*a* will have some input balancing registers 103*a* so that the calculation of adding the results of multipliers 102*a* and 102*b* can be performed directly. In this case two registers 201 and 203 are used in the interblock path (the interblock connection 202), which may require two additional balancing registers for input 208 accordingly, if all of the multiplier pipeline registers 101*b* in DSP block 160*b* are used (e.g., no pipeline register is bypassed). Here the existing input balancing registers 103*a* in DSP block 160*a* can be used to cause additional delays for input 208 instead of adding more registers. In this way, the two inputs at the adder 106*a* are balanced, i.e., with equal or substantially equal delays. For example, as shown at block 160*a* in FIG. 12, for one input branch of the adder 106*a*, after pipeline delays 101*a*, data coming from input C 208 is re-directed to registers 103*a* in block 160*a*, before being transmitted to the adder register 105*a*; and for the other input branch of the adder 106*a*, data input at block 160*b* is passed through pipeline registers 101*b*, register 201, interblock register 203, and then the adder register 104*a*. The numbers of registers on the two input branches of the adder 106*a* are the same.

Figure 13:
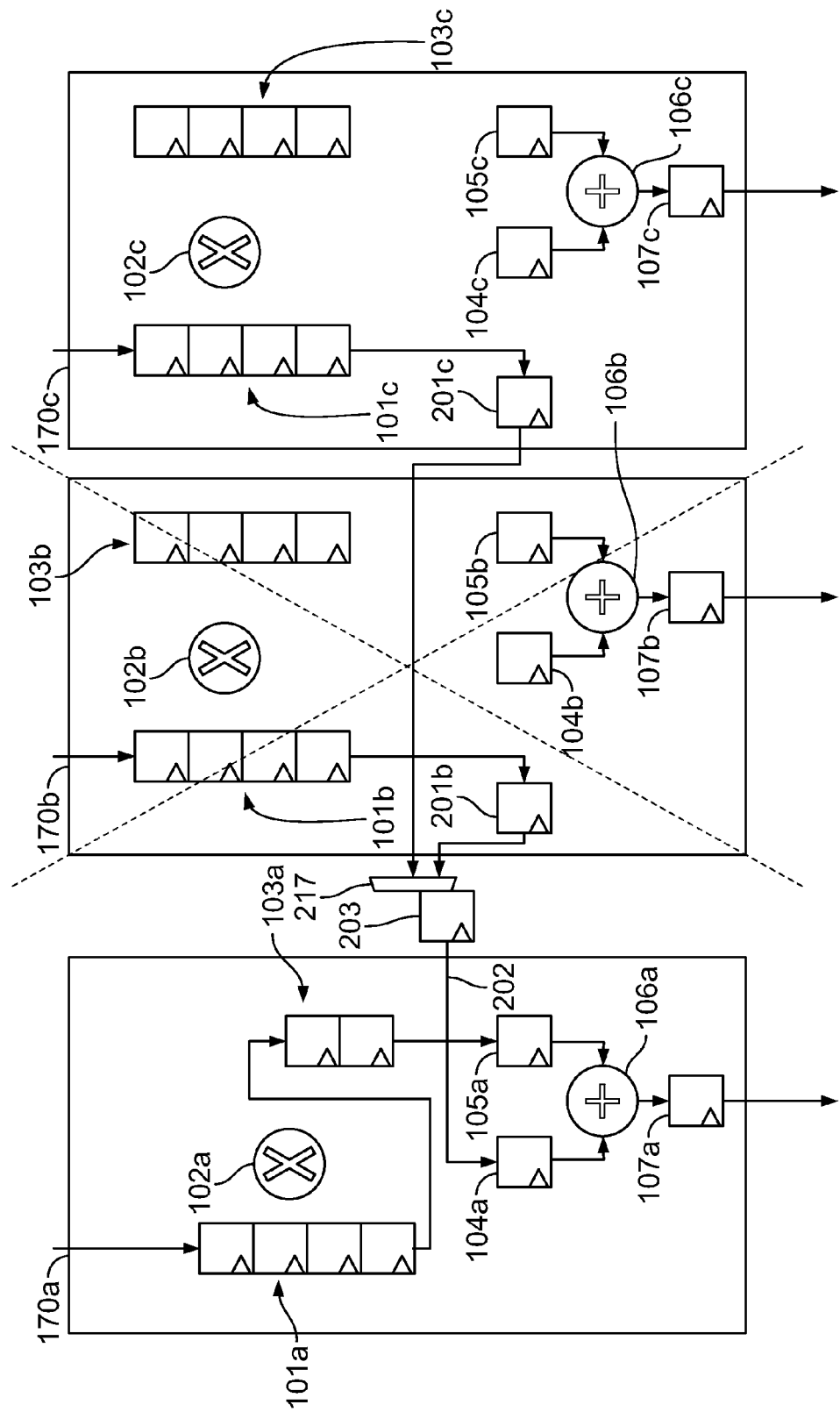
FIG. 13 shows an example circuit diagram illustrating the use of a multiplexer placed before redundancy register 203 on the interblock connection 202.

FIG. 13 shows an example circuit diagram illustrating the use of a multiplexer 217 placed before register 203 on the interblock connection 202. As shown in FIG. 13, DSP blocks 170*a-c* are chained in a row (with elements 101*a-c*, 102*a-c*, 103*a-c*, 104*a-c*, 105*a-c*, 106*a-c* and 107*a-c* analogous to those discussed with blocks 150*a-b* in FIG. 10), and DSP blocks 170*b-c* each has an interblock delay register 201*b-c*, respectively. Specifically, balancing registers 103*a* can be used to provide additional delay to the path through pipeline registers 101*a* so that an external input 104*a* can be added to the result of a multiplication. The external input 104*a* has been delayed along the path through pipeline registers 101*c* and additional registers 201*c* and 203. A multiplexer 217 can be placed between DSP blocks 170*a* and 170*b* such that the interblock input into block 170*a* (e.g., which will be fed into the adder 107*a* via register 104*a*) can be chosen from either register 201*b* of block 170*b*, or register 201*c* of block 170*c*. For example, when the block 170*b* has a defect, the system that employs the DSP chain 170*a-c* can choose to skip it via the multiplexer 217, which may result in extra delay because of skipping data from block 170*b*. A register 203 is placed after the multiplexer 217 to introduce delay for the interblock path from block 170*b-c*. In this way, when input from block 170*b* is skipped, the register 203 helps maintain the data throughput, and thus the DSP structure 170*a-c* can support a high speed vector mode.

Figure 14:
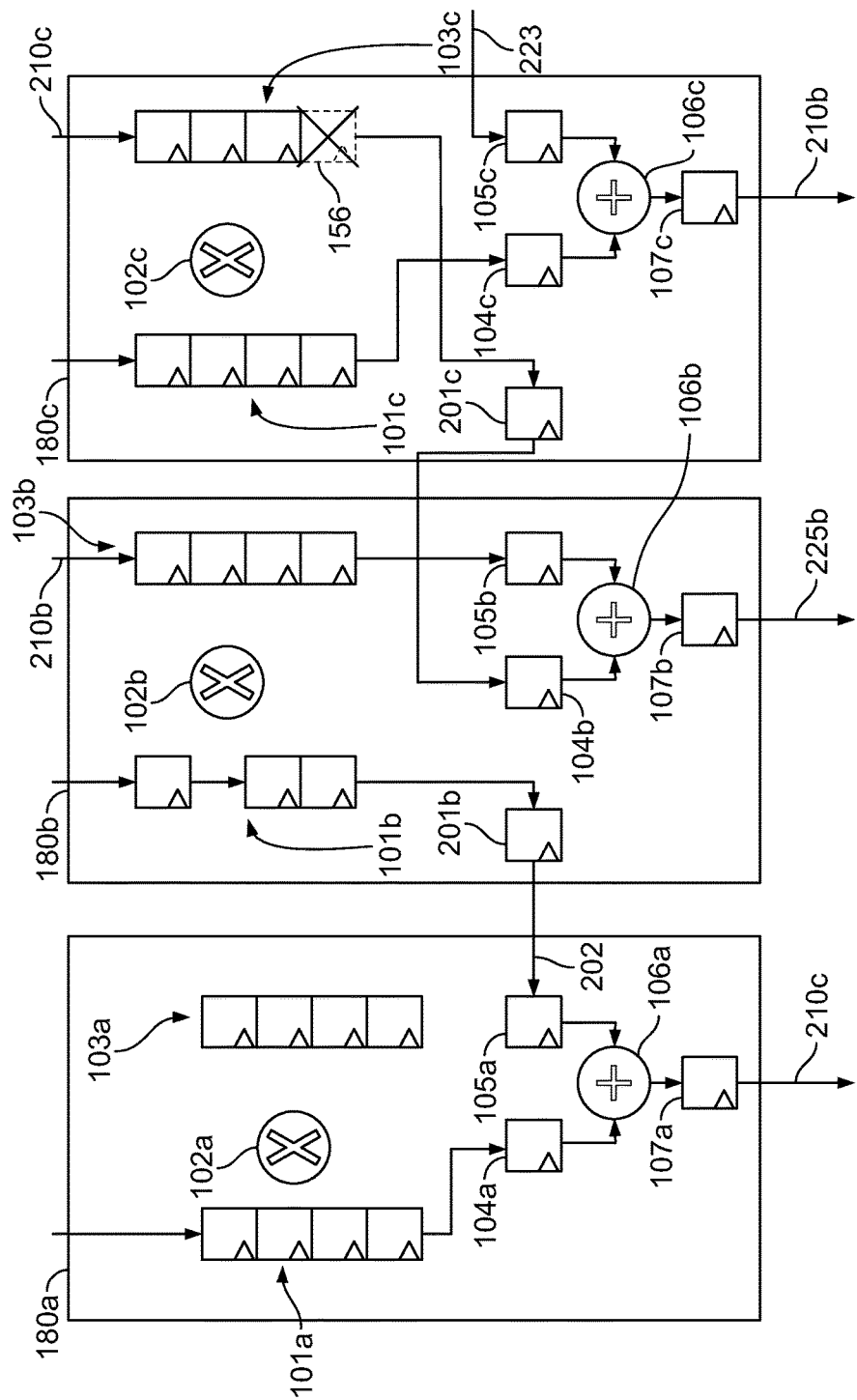
FIG. 14 shows an example circuit diagram illustrating that the adder input balancing paths 103 can be used in conjunction with registers 201 (and interblock pipeline 203 that can be placed after register 201 as shown in FIG. 12) to improve the performance of the later adder tree portion of a vector structure.

FIG. 14 shows an example circuit diagram illustrating that the adder input balancing paths 103 can be used in conjunction with registers 201 (and interblock pipeline 203 that can be placed after register 201 as shown in FIG. 12) to improve the performance of the later adder tree portion of a vector structure. As shown in FIG. 14, operated under a recursive-vector mode, the floating-point adder 106a in DSP block 180a adds the results from the multipliers 102a-b. In DSP block 180c, the floating-point adder 106c in DSP block 180c adds the result from multiplier 102c and input 223 (which can be transmitted from another DSP block not shown in FIG. 14, e.g., from the multiplier in the other DSP block). In DSP block 180b, the adder 106b adds the outputs of DSP blocks 180a-b, e.g., the output of block 180c can be routed to the input 210b of block 180b, and the output of block 180a can be routed to the input 210c of block 180c. Thus the three blocks are interconnected in a recursive manner. Further details of recursive-vector mode operations are discussed in copending, commonly-assigned U.S. patent application Ser. No. 13/752,661, filed Jan. 29, 2013, and U.S. patent application Ser. No. 13/941,847, filed Jul. 15, 2013, each of which is hereby expressly incorporated by reference herein in its respective entirety.

In DSP block 180a, adder input balancing path 103a can have the same number of pipeline stages as the floating-point multiplier pipeline 101a, e.g., 4 pipelines in this respective example. In DSP block 180b, the adder 106b is fed by input 210b of DSP block 180b and input 210c of DSP block 180c, in this example 4 stages. By bypassing one of the balancing registers 103c (e.g., see bypassed register 156) in DSP block 180c, cascade register 201c can be used in DSP block 180c along the input path for input 210c to cause the delays from input paths 210B and 210c to be substantially equal. In this way, when a device that employs the DSP blocks 180a-c selectively bypasses one or more register, power consumption efficiency can be improved. For example, the connection configuration for the balancing registers can be a selectable connection that allows one or more balancing registers to be selectively bypassed.

Figure 15:
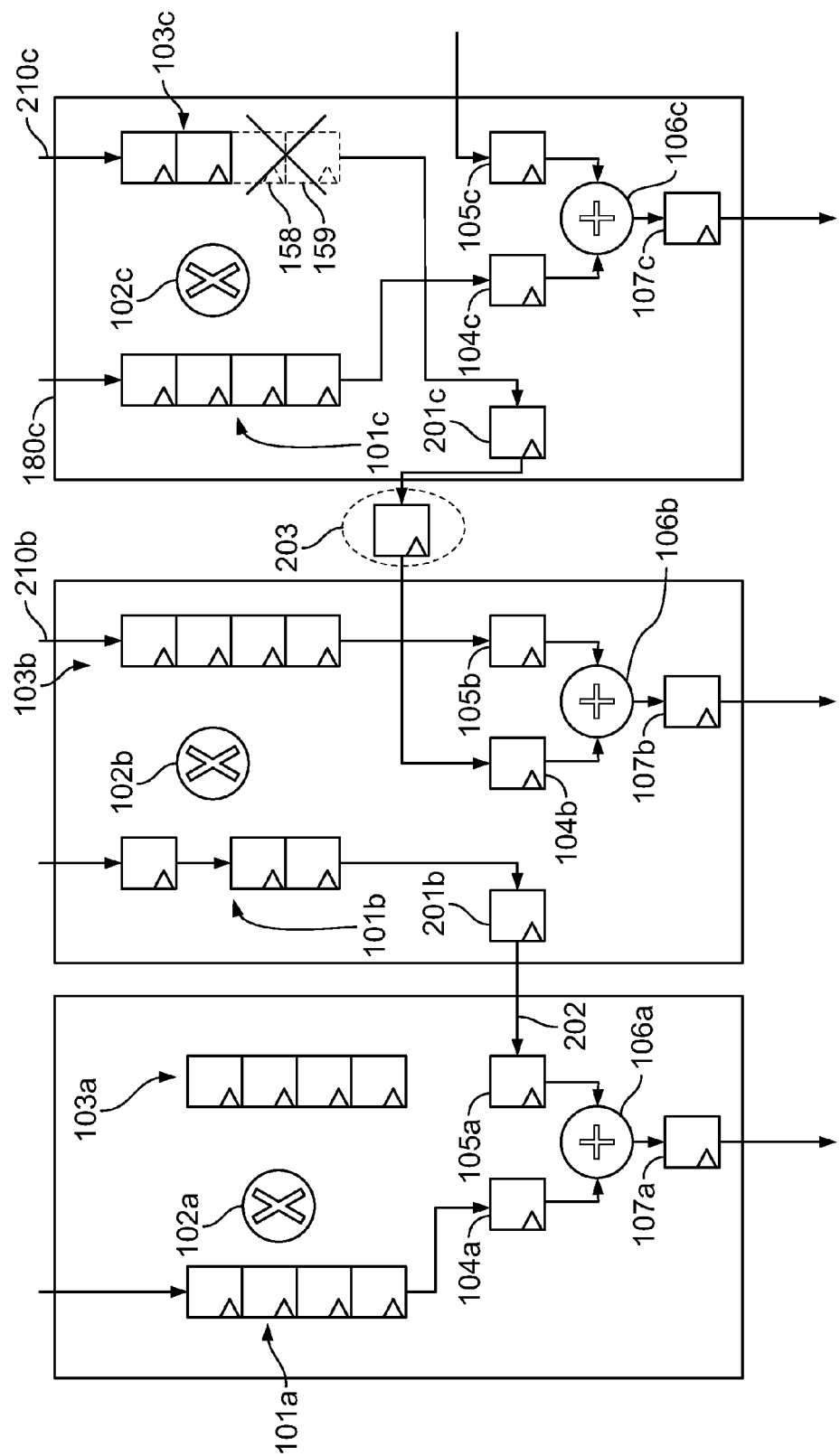
FIG. 15 shows another example circuit diagram similar to that in FIG. 14, with an additional input balancing register 103b in the input path balancing registers 103 of DSP block 180c has been bypassed to allow interblock register 203 to be used.

FIG. 15 shows another example circuit diagram similar to that in FIG. 14, with an additional input balancing register 103b in the input path balancing registers 103 of DSP block 180c has been bypassed to allow interblock register 203 to be used. Register 203 can be used to give additional delay in the path. The bypassing of any one or more registers in one of the balancing paths may not have to follow a particular pattern. The register(s) in a chain (e.g., as registers 158-159 in 103c) bypassed will be chosen as the one to have the least impact on performance. In an alternative example to the respective example shown in FIG. 15, in DSP block 180c, the first and last registers in the path can be kept in use (not shown in FIG. 15) so that the path from input 210 to the input balancing registers 103 can be kept as short as possible, and the path from the input balancing registers 103 to register 201 is also made as short as possible.

Figure 16:
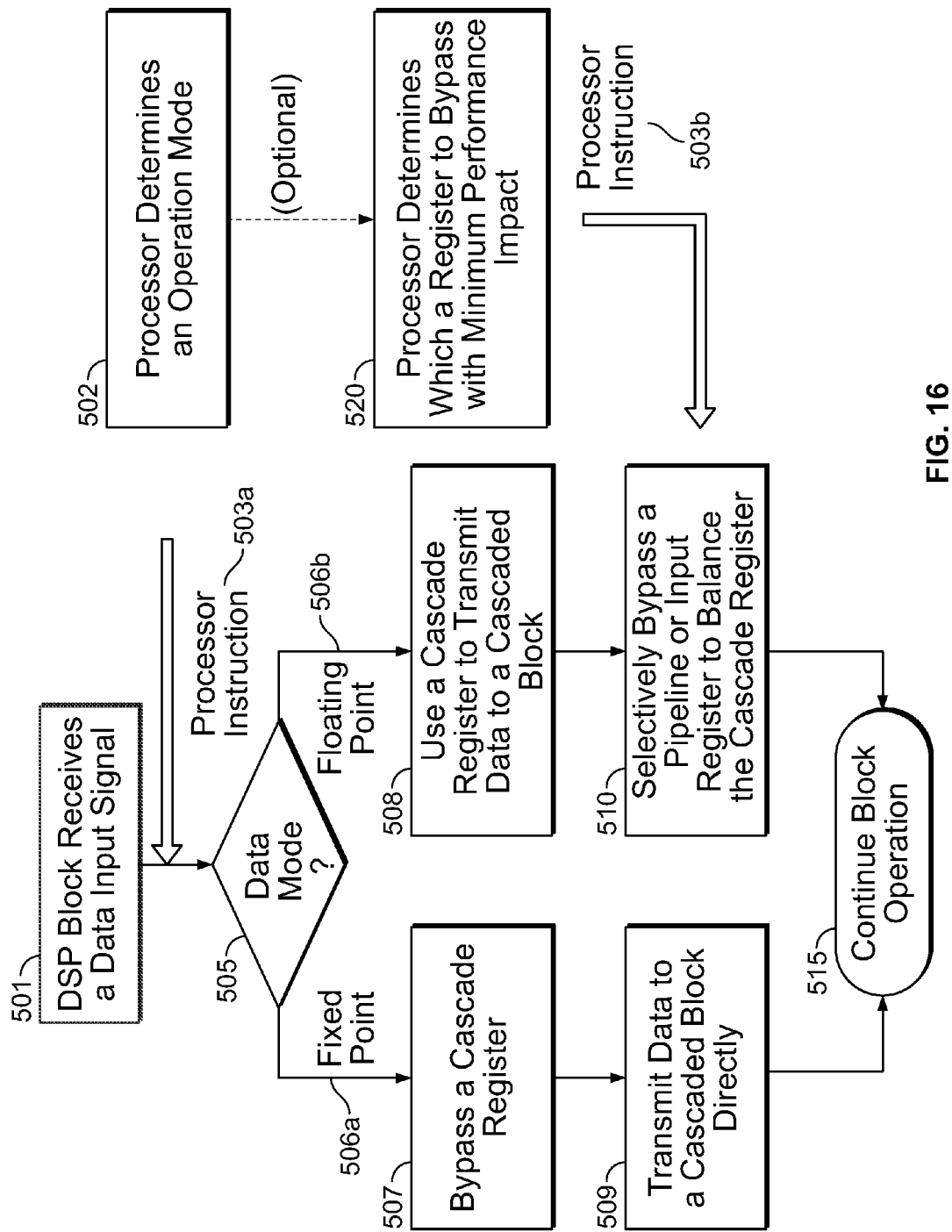
FIG. 16 shows an example logic flow diagram illustrating work flows of operating cascaded DSP blocks under a floating-point mode or a fixed-point mode, e.g., the circuit structures shown in FIGS. 6-15.

FIG. 16 shows an example logic flow diagram illustrating an operation of cascaded DSP blocks under a floating-point mode or a fixed-point mode, e.g., by dynamically configuring the circuit structures shown in FIGS. 6-15. A processor (e.g., see element 601 in FIG. 17) of a device or system that employs the cascaded DSP block structures illustrated in FIGS. 1-15 can send instructions, e.g., a command signal, to a DSP block to control the operation of the DSP block. A memory unit (e.g., see element 602 in FIG. 17) of the device or system that employs the cascaded DSP block structures can store processor-executable instructions for the processor to read and execute, and thus control the operation of the DSP block.

As shown in FIG. 16, a DSP block can receive a data input signal (step 501), which can be of a fixed-point format or a floating-point format depending on the operating mode of the DSP block. A processor can determine the operation mode for the DSP block (step 502), and send processor instructions 503a to the DSP block. The processor instructions 503a can include a command signal to use or bypass a cascade register depending on the operating mode of the DSP block.

For example, if the DSP block is operated under a fixed-point mode 506a, the processor instructions 503a control the DSP block to bypass a cascade register (step 507) and then transmit interblock data directly from the respective DSP block to a cascaded block (step 509).

In an alternative example, if the DSP block is operated under a floating-point mode 506b, the processor instructions 503a control the DSP block to use the cascade register to transmit interblock data to a cascaded block (step 508), and selectively bypass a pipeline register or an input register within the DSP block to balance the cascade register (step 510). Further example structures on bypassing pipeline registers or input registers without introducing additional balancing registers are previously discussed in connection with FIGS. 11-14.

In some instances, the processor can optionally determines which register from the pipelines or input balancing registers to bypass so as to induce minimum performance impact to the DSP block, and to the system (step 520), e.g., the first and the last registers are usually kept. The processor may send processor instruction 503b to the DSP block to indicate which registers to bypass for step 510. The DSP block may then continue the operation (step 515), e.g., by receiving a new input (back to step 501).

In an alternative implementation, the DSP blocks can have a static configuration for fixed-point or floating-point operation. For example, the pipeline registers, and/or the balancing registers that are used or bypassed, can be pre-configured before an operation of the DSP block.

Figure 17:
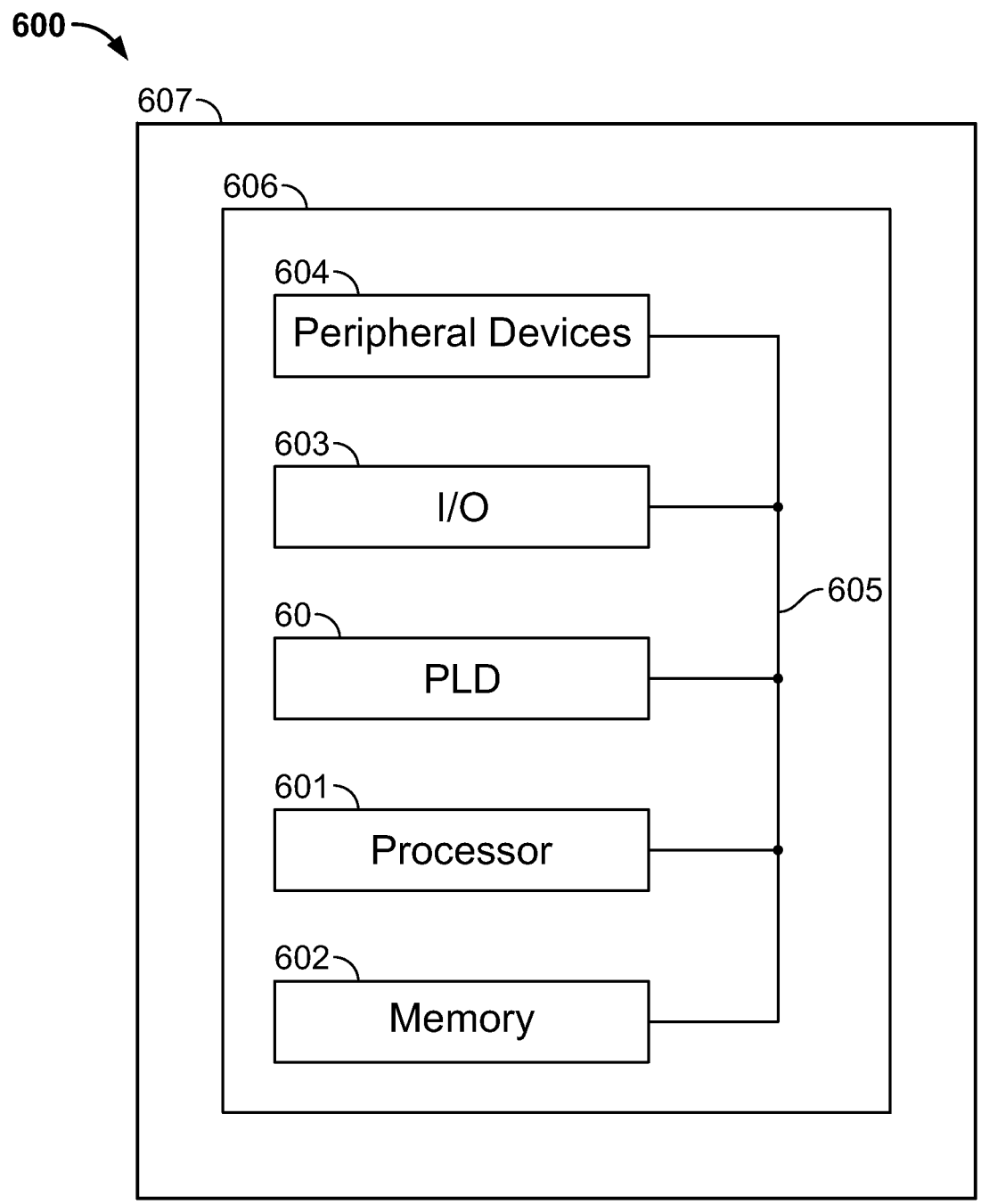
FIG. 17 is a simplified block diagram of an exemplary system employing a programmable logic device incorporating the present invention.

FIG. 17 is a simplified block diagram of an exemplary system employing a programmable logic device incorporating the present invention. A PLD 60 configured to include arithmetic circuitry according to any implementation of the present invention may be used in many kinds of electronic devices. One possible use is in an exemplary data processing system 600 shown in FIG. 6. Data processing system 600 may include one or more of the following components: a processor 601; memory 602; I/O circuitry 603; and peripheral devices 604. These components are coupled together by a system bus 605 and are populated on a circuit board 606 which is contained in an end-user system 607.

System 600 can be used in a wide variety of applications, such as computer networking, data networking, instrumentation, video processing, digital signal processing, Remote Radio Head (RRH), or any other application where the advantage of using programmable or reprogrammable logic is desirable. PLD 60 can be used to perform a variety of different logic functions. For example, PLD 60 can be configured as a processor or controller that works in cooperation with processor 601. PLD 60 may also be used as an arbiter for arbitrating access to shared resources in system 600. In yet another example, PLD 60 can be configured as an interface between processor 1801 and one of the other components in system 600. It should be noted that system 600 is only exemplary, and that the true scope and spirit of the invention should be indicated by the following claims.

Various technologies can be used to implement PLDs 60 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry operating under a floating-point mode or a fixed-point mode, said circuitry comprising:
   a first circuit accepting a first data input and generating a first data output, the first circuit including:
      a first arithmetic element accepting the first data input,
      a plurality of pipeline registers disposed in connection with the first arithmetic element, and
      a cascade register that outputs the first data output; and
   a second circuit accepting a second data input and generating a second data output, wherein:
      the second circuit is cascaded to the first circuit such that the first data output is connected to the second data input via the cascade register, and
      the cascade register is selectively bypassed when the first circuit is operated under the fixed-point mode.

2. The circuitry of claim 1, wherein the first arithmetic element includes a multiplier that supports floating-point multiplication.

3. The circuitry of claim 1, wherein the second circuit includes a second arithmetic element that supports floating-point operation, and wherein
   the second arithmetic element accepts the second data input via the cascade register and generates the second data output.

4. The circuitry of claim 1, wherein the cascade register and a balancing register are used when the first circuit and the second circuit are operated under the floating-point mode.

5. The circuitry of claim 1, wherein a pipeline register from the plurality of pipeline registers is selectively bypassed when the cascade register is used.

6. The circuitry of claim 1, wherein the second circuit further includes a second arithmetic element, a third arithmetic element, a second plurality of pipeline registers disposed with the second arithmetic element, and a plurality of input balancing registers, and wherein the second arithmetic element accepts the second data input.

7. The circuitry of claim 6, wherein a last register of the second plurality of pipeline registers is connected to an input balancing register from the plurality of input balancing registers, and
   data from the input balancing register is fed into the second arithmetic element.

8. The circuitry of claim 1, further comprising:
   a third circuit accepting a third data input and generating a third data output.

9. A method of operating cascaded circuitry, comprising:
   receiving, via a plurality of input registers within a first circuit, a data input signal, wherein
   the first circuit includes:
      a first arithmetic element that supports floating-point operation,
      a plurality of pipeline registers that pipeline an operation of the first arithmetic element, and
      a cascade register that is connected to a second circuit;
   receiving, from a processor, a first command signal to use the cascade register; and
   in response to the first command signal:
      selectively bypassing an input register from the plurality of input registers, or a pipeline register from the plurality of pipeline registers to compensate for a delay from the cascade register, and
      transmitting, via the cascade register, an interblock data signal from the first circuit to the second circuit.

10. The method of claim 9, further comprising:
    receiving, from the processor, a second command signal to bypass the cascade register; and
    in response to the second command signal,
       transmitting the interblock data signal from the first circuit to the second circuit without passing through the cascade register.

11. The method of claim 10, wherein:
    the processor sends the first command signal when the data input signal has a floating-point format; and
    the processor sends the second command signal when the data input signal has a fixed-point format.

* * * * *